US011194538B2

(12) United States Patent
Inamoto et al.

(10) Patent No.: US 11,194,538 B2
(45) Date of Patent: Dec. 7, 2021

(54) IMAGE MANAGEMENT SYSTEM, IMAGE MANAGEMENT METHOD, AND PROGRAM

(71) Applicant: Ricoh Company, Ltd., Tokyo (JP)

(72) Inventors: Hirohisa Inamoto, Kanagawa (JP); Yusuke Fukuoka, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 157 days.

(21) Appl. No.: 15/533,727

(22) PCT Filed: Nov. 25, 2015

(86) PCT No.: PCT/JP2015/083135
§ 371 (c)(1),
(2) Date: Jun. 7, 2017

(87) PCT Pub. No.: WO2016/093063
PCT Pub. Date: Jun. 16, 2016

(65) Prior Publication Data
US 2018/0373483 A1    Dec. 27, 2018

(30) Foreign Application Priority Data

Dec. 8, 2014 (JP) .............................. JP2014-247858

(51) Int. Cl.
*G06F 3/14* (2006.01)
*H04N 5/225* (2006.01)
(Continued)

(52) U.S. Cl.
CPC ............ *G06F 3/1454* (2013.01); *G06F 16/51* (2019.01); *G06F 16/955* (2019.01);
(Continued)

(58) Field of Classification Search
None
See application file for complete search history.

(56) References Cited

U.S. PATENT DOCUMENTS

2005/0144134 A1   6/2005  Hirano
2007/0182812 A1*  8/2007  Ritchey ............... H04N 5/2254
                                                       348/36
(Continued)

FOREIGN PATENT DOCUMENTS

CN    102572270 A    7/2012
CN    102779031 A   11/2012
(Continued)

OTHER PUBLICATIONS

Office Action dated Feb. 13, 2018 in Japanese Patent Application No. 2016-563604.
(Continued)

*Primary Examiner* — Amare Mengistu
*Assistant Examiner* — Sarvesh J Nadkarni
(74) *Attorney, Agent, or Firm* — Xsensus LLP

(57) ABSTRACT

An image management system includes a reception unit and transmission unit. The reception unit receives, from a first communication terminal, link information that is transmitted from the image management system and is managed in a link information management system. The transmission unit transmits, to the first communication terminal, a view script and image data corresponding to the link information. The image data is received from a second communication terminal.

12 Claims, 24 Drawing Sheets

FULL-SPHERICAL
PANORAMIC IMAGE

(51) Int. Cl.
*G06F 16/955* (2019.01)
*G06F 16/51* (2019.01)
*H04N 5/232* (2006.01)

(52) U.S. Cl.
CPC ....... *H04N 5/2251* (2013.01); *H04N 5/23238* (2013.01); *G09G 2370/022* (2013.01); *G09G 2370/04* (2013.01); *H04N 2201/3276* (2013.01)

(56) References Cited

U.S. PATENT DOCUMENTS

| | | |
|---|---|---|
| 2008/0291217 A1 | 11/2008 | Vincent et al. |
| 2009/0031246 A1* | 1/2009 | Cowtan .................. G06Q 30/00 715/786 |
| 2009/0059005 A1* | 3/2009 | Hattori ............... G06K 9/00805 348/148 |
| 2011/0173565 A1* | 7/2011 | Ofek ....................... G09B 29/00 715/790 |
| 2011/0254915 A1 | 10/2011 | Vincent et al. |
| 2012/0200665 A1* | 8/2012 | Furumura ............. G06T 3/0062 348/36 |
| 2013/0032641 A1 | 12/2013 | Harada et al. |
| 2013/0326419 A1* | 12/2013 | Harada ............... G06F 3/04817 715/838 |
| 2014/0160119 A1 | 6/2014 | Vincent et al. |
| 2014/0184821 A1 | 7/2014 | Taneichi et al. |
| 2014/0333719 A1* | 11/2014 | Williams .......... H01L 27/14625 348/36 |
| 2014/0340427 A1* | 11/2014 | Baker .................. H04N 9/3185 345/641 |
| 2015/0161820 A1 | 6/2015 | Vincent et al. |
| 2016/0295110 A1 | 10/2016 | Taneichi et al. |
| 2017/0310893 A1 | 10/2017 | Taneichi |

FOREIGN PATENT DOCUMENTS

| | | |
|---|---|---|
| CN | 103020340 A | 4/2013 |
| CN | 103858234 A | 6/2014 |
| JP | 2000-268044 | 9/2000 |
| JP | 2004-013535 | 1/2004 |
| JP | 2004-126633 | 4/2004 |
| JP | 2005-056295 A | 3/2005 |
| JP | 2005-190440 | 7/2005 |
| JP | 2005-352885 A | 12/2005 |
| JP | 2008-236785 A | 10/2008 |
| JP | 2014-006880 | 1/2014 |
| JP | 2014-131215 | 7/2014 |

OTHER PUBLICATIONS

Extended European Search Report dated Nov. 20, 2017 in European Patent Application No. 15867653.6 8 pages.
International Search Report dated Feb. 16, 2016 in PCT/JP2015/083135 filed on Nov. 25, 2015.
Yasushi Kumon, "Kono Issatsu de Subete Wakaru! 360-do VR Panorama Seisaku Perfect Guide", first edition, Shuwa System Co., Ltd., Jan. 1, 2012, p. 50 to 55, 192 to 193, 220-233.
Combined Chinese Office Action and Search Report dated Jun. 12, 2020 in Chinese Patent Application No. 2015800665460.2 (with English franslation), 21 pages.
Summons to attend oral proceedings dated Oct. 8, 2021 in European Patent Application No. 15 867 653.6, 17 pages.

* cited by examiner

FULL-SPHERICAL
PANORAMIC IMAGE

FIG.14
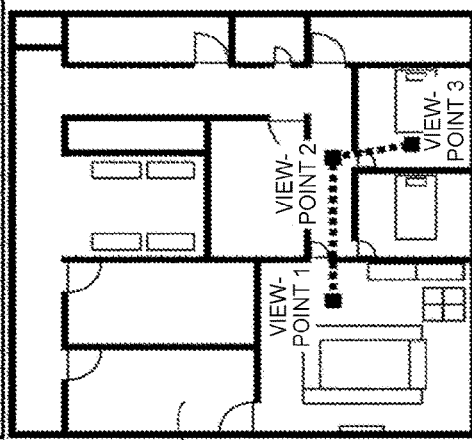
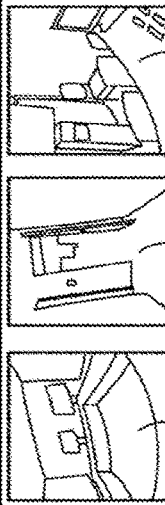
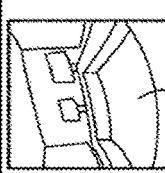

FIG.15
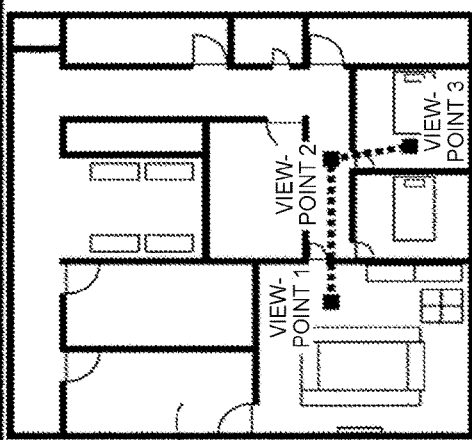
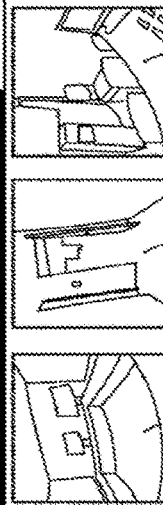

FIG.20

IMAGE MANAGEMENT TABLE

| USER ID | IMAGE ID | FILE NAME OF IMAGE DATA |
|---|---|---|
| u100001 | au1415ifauy | au1415ifauy.jpg |
| u100002 | au1416ifauy | au1416ifauy.jpg |
| ⋮ | ⋮ | ⋮ |

FIG.21

THUMBNAIL MANAGEMENT TABLE

| THUMBNAIL ID | IMAGE ID | FILE NAME OF THUMBNAIL DATA |
|---|---|---|
| t0001 | au1415ifauy | au1415ifauy.thum.jpg |
| t0002 | au1416ifauy | au1416ifauy.thum.jpg |
| ⋮ | ⋮ | ⋮ |

FIG.22

USER MANAGEMENT TABLE

| USER ID | PASSWORD | USER IMAGE | USER PERSONAL INFORMATION |
|---------|----------|------------|---------------------------|
| u100001 | up00001  | u100001.jpg | X1X REAL ESTATE, ⋯ |
| u100002 | up00002  | u100002.jpg | X2X REAL ESTATE, ⋯ |
| ⋮ | ⋮ | ⋮ | ⋮ |

FIG.23

PROPERTY MANAGEMENT TABLE

| PROPERTY ID | USER ID | LINK INFORMATION | FILE NAME OF THUMBNAIL DATA | RELATED INFORMATION | RELATED IMAGE |
|---|---|---|---|---|---|
| a20001 | u100001 | http://example.com/au1415ifauy/rH230rV439angle35 | au1415ifauy.thum.jpg | ... | au152ifauy.jpg |
| a20002 | u100002 | http://example.com/au1416ifauy/rH50rV100angle30 | au1416ifauy.thum.jpg | ... | au153ifauy.jpg |
| ... | ... | ... | ... | ... | ... |

IMAGE MANAGEMENT SYSTEM, IMAGE MANAGEMENT METHOD, AND PROGRAM

FIELD

The present invention relates to an image management system, an image management method, and a program.

BACKGROUND

Recently, a special digital camera to obtain a 360° full-spherical panoramic image with one-time capturing has been provided (see Patent Literature 1).

In addition, when a subject is a real estate property or the like, it is convenient for a user who looks for a property using the internet if it is possible to view a full-spherical panoramic image instead of a partial image of the subject. Thus, a service provider who provides property information to the user has a need of desiring to provide the full-spherical panoramic image to the user looking for the property in order to achieve differentiation from other service providers.

SUMMARY

Technical Problem

However, an application configured to view a specific image, such as the full-spherical panoramic image, is not necessarily installed in a communication terminal of the user. Thus, there occurs a problem that it is difficult to achieve the differentiation from other service providers even when the service provider constructs the system capable of providing the specific image unless the specific image can be viewed on the user side.

Solution to Problem

The invention according to claim 1 provides an image management system that communicates with a first communication terminal via a communication network and includes an image storing unit that stores therein image data and a view script for viewing of the image data; a reception unit that receives, from the first communication terminal, link information including image identification information for identifying the image data; and a transmission unit that transmits, to the first communication terminal, the view script and the image data specified by the image identification information included in the link information received by the reception unit.

Advantageous Effects of Invention

According to the present invention, the user of the communication terminal can view the specific image even if the application configured to view the specific image is not installed at the communication terminal. Accordingly, the service provider can improve the service to the user, and thus, can achieve an effect that it is possible to achieve the differentiation from other service providers.

BRIEF DESCRIPTION OF DRAWINGS

FIG. 2-1 is a left side view of a capturing device.

FIG. 2-2 is a front view of the capturing device.

FIG. 2-3 is a plan view of the capturing device.

FIG. 3 is a use image view of the capturing device.

FIG. 4-1 is a view illustrating a hemispheric image (front) captured by the capturing device.

FIG. 4-2 is a view illustrating a hemispheric image (rear) captured by the capturing device.

FIG. 4-3 is a view illustrating an image expressed by Mercator projection.

FIG. 5-1 is a view illustrating the image expressed by the Mercator projection and a part of an image for sharing selection.

FIG. 5-2 is a view illustrating the sharing selection image.

FIG. 10-1 is a stereoscopic view of FIG. 9.

FIG. 10-2 is a view illustrating a communication terminal with a display on which an image of a predetermined area is displayed.

FIG. 14 is a diagram illustrating a screen example of a real estate property.

FIG. 15 is a screen example of a real estate property.

FIG. 20 is a conceptual diagram illustrating an image management table.

FIG. 21 is a conceptual diagram illustrating a thumbnail management table.

FIG. 22 is a conceptual diagram illustrating a user management table.

FIG. 23 is a conceptual diagram illustrating a property management table.

DESCRIPTION OF EMBODIMENTS

Hereinafter, an embodiment of the present invention will be described with reference to the drawings.

Overview of Embodiment

Figure 1:
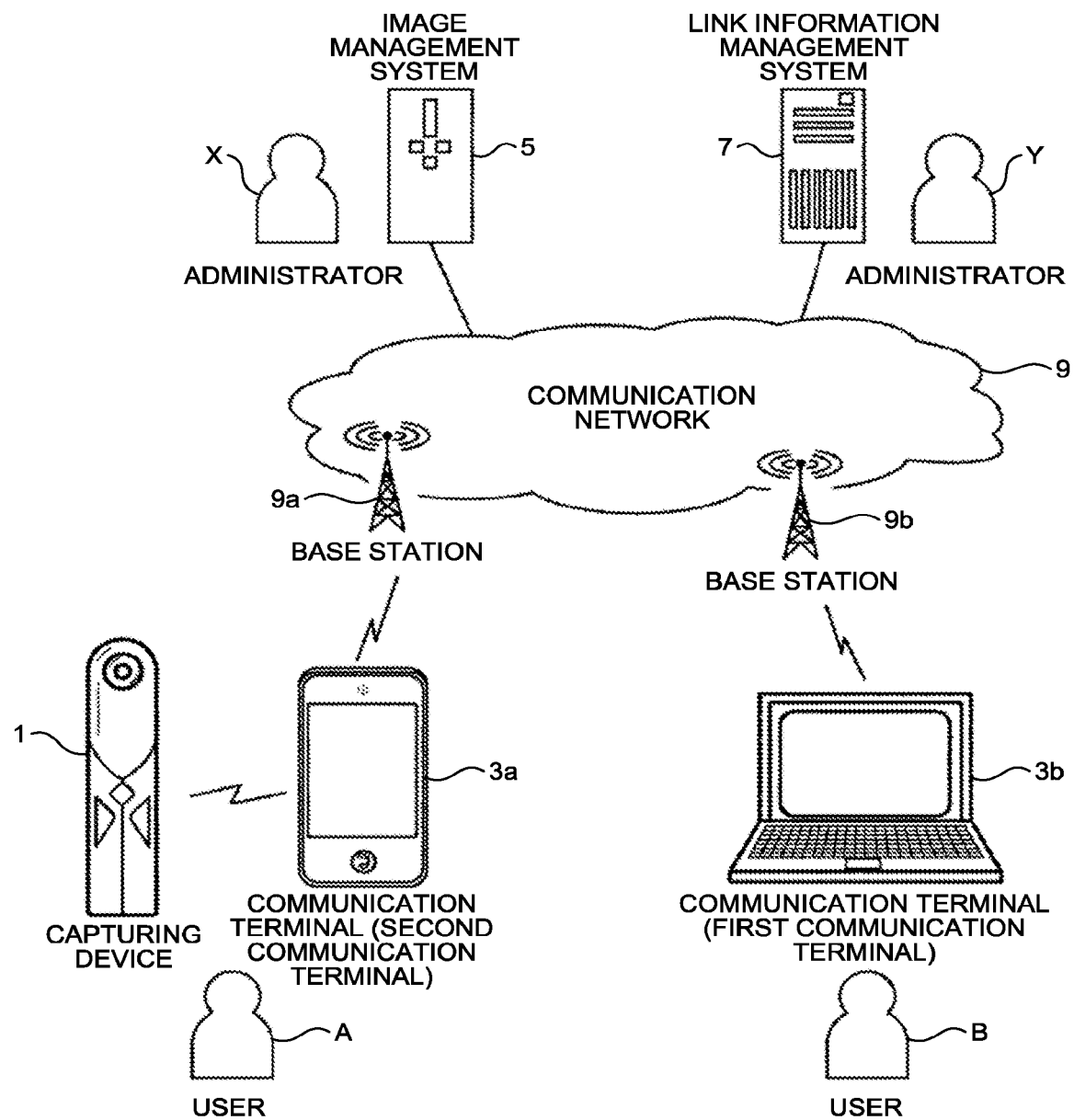
FIG. 1 is a schematic diagram of an image sharing system according to an embodiment of the present invention.

First, the outline of the present embodiment will be described with reference to FIGS. 1 to 15. FIG. 1 is a schematic diagram of an image sharing system according to the present embodiment.

As illustrated in FIG. 1, the image sharing system according to the present embodiment includes a capturing device 1, a plurality of communication terminals (3a, 3b), an image management system 5, and a link information management system 7. The communication terminals (3a, 3b) are used by users (A, B), respectively. In addition, the present embodiment illustrates a case where the capturing device 1 is operated by the user A. Incidentally, an arbitrary communication terminal of the plurality of communication terminals (3a, 3b) will be referred to as a "communication terminal 3", hereinafter. The image management system 5 is managed by an administrator X. The link information management system 7 is managed by an administrator Y. For example, the user A corresponds to each realtor in a certain area. The user B corresponds to a general user who looks for a target property for purchase, trade, lease or the like of a real estate property. The administrator X is a provider of an image (full-spherical panoramic image) in the image sharing system who provides, to the user B, image data acquired from the user A. The administrator Y is a service provider of real estate information who provides property information to the user B via a communication network 9 such as the internet.

In addition, the capturing device 1 is a digital camera configured to obtain the full-spherical (360°) panoramic image. The capturing device 1 may be a general digital camera, or the communication terminal 3 may be a digital camera in a case where a camera is attached to the communication terminal 3. In the present embodiment, the capturing device 1 will be described as the digital camera configured to obtain the full-spherical panoramic image in order to facilitate the description. The communication terminal 3 is a computer such as a smartphone, a tablet terminal, a notebook-type personal computer, a desktop-type personal computer, and a personal data assistance (PDA). Herein, the communication terminal 3a is expressed as the smartphone, and the communication terminal 3b is expressed as a notebook personal computer (PC), for example. Further, the image management system 5 and the link information management system 7 are server computers.

In addition, the capturing device 1 can communicate with the communication terminal 3 according to a short-range wireless technology such as a near field communication (NFC) standard, BlueTooth (registered trademark), and wireless fidelity (WiFi). Further, the communication terminal 3 can communicate with the image management system 5 and the link information management system 7 via the communication network 9. The communication network 9 is constructed using: wireless communication network such as 3rd generation (3G), worldwide interoperability for microwave access (WiMAX), and long term evolution (LTE); respective base stations (9a, 9b); and the Internet. Wired-communication may be performed between the capturing device 1 and the communication terminal 3, and between the communication terminal 3 and the communication network 9.

The communication terminal 3a is an example of a second communication terminal, and the communication terminal 3b is an example of a first communication terminal.

Figures 1, 2:
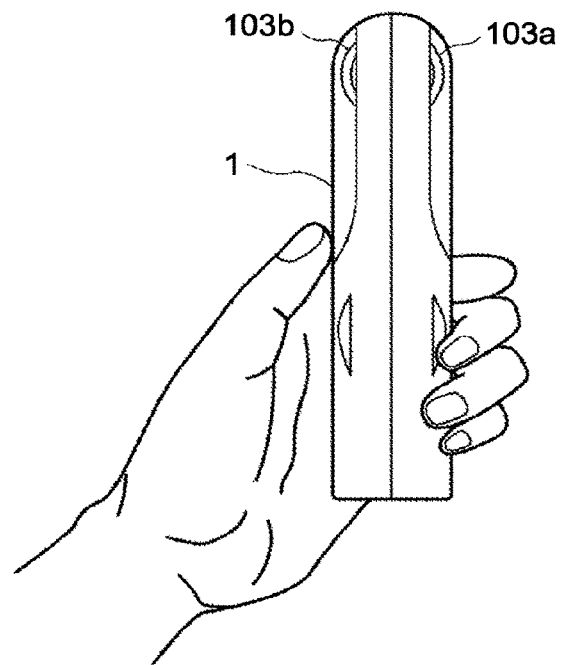
Figure 2:
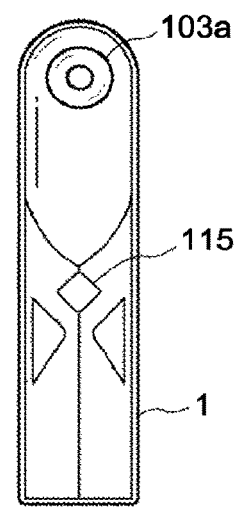
Figures 2, 3:
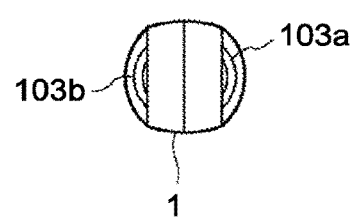
Figure 3:
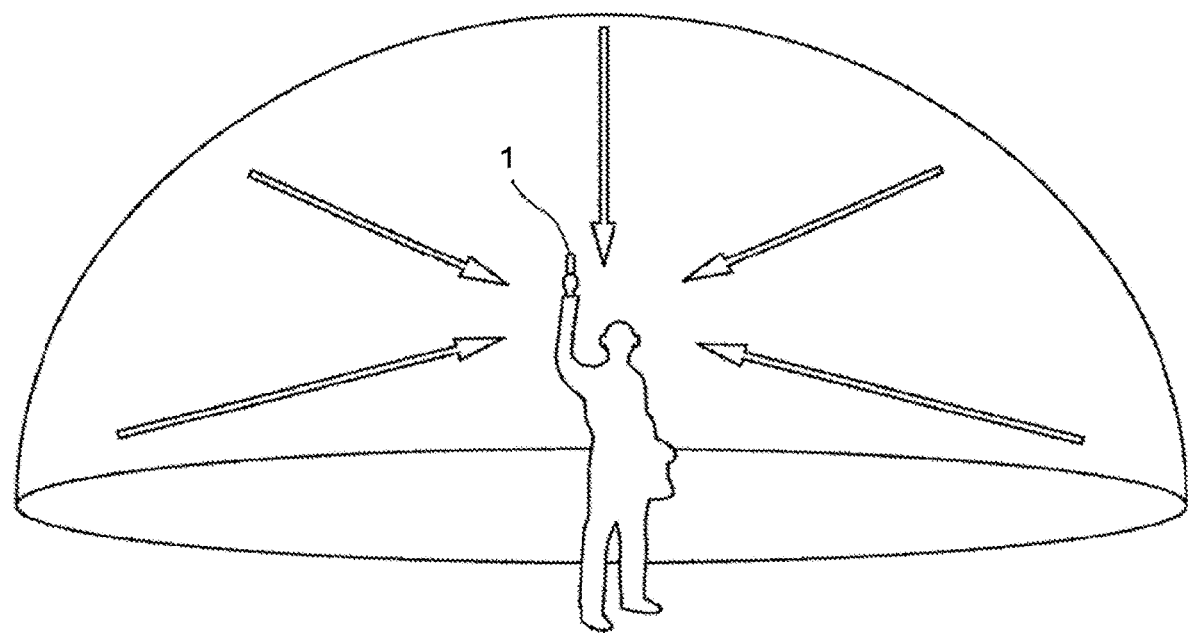

Next, the exterior of the capturing device 1 will be described with reference to FIGS. 2-1 to 2-3. FIG. 2-1 is a left side view of the capturing device, FIG. 2-2 is a front view of the capturing device, and FIG. 2-3 is a plan view of the capturing device.

As illustrated in FIG. 2-1, the capturing device 1 has a size of being held by one hand of a man. In addition, an imaging element 103a is provided on a front surface side (front side) and an imaging element 103b is provided on a back surface side (rear side) in an upper part of the capturing device 1 as illustrated in FIGS. 2-1, 2-2, and 2-3. In addition, an operation unit 115 such as a shutter button is provided on the front surface side of the capturing device 1 as illustrated in FIG. 2-2.

Next, a use status of the capturing device 1 will be described with reference to FIG. 3. FIG. 3 is a use image view of the capturing device. The capturing device 1 is used to capture a subject around a user by being held by the user's hand as illustrated in FIG. 3. In this case, each of the imaging element 103a and the imaging element 103b illustrated in FIGS. 2-1 to 2-3 images the subject around the user, thereby obtaining two hemispheric images.

Figures 1, 4:
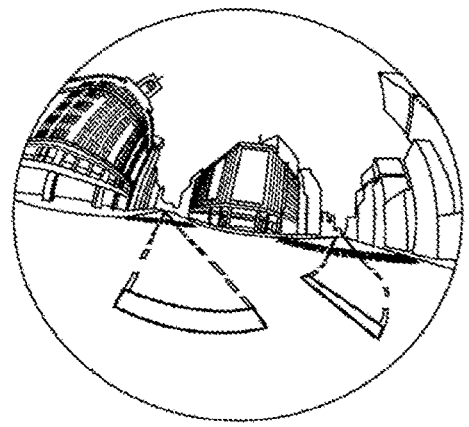
Figures 2, 4:
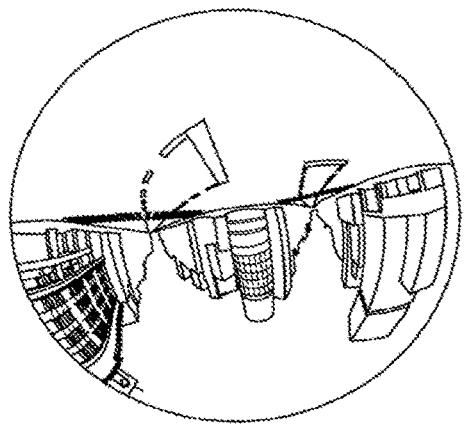
Figures 3, 4:
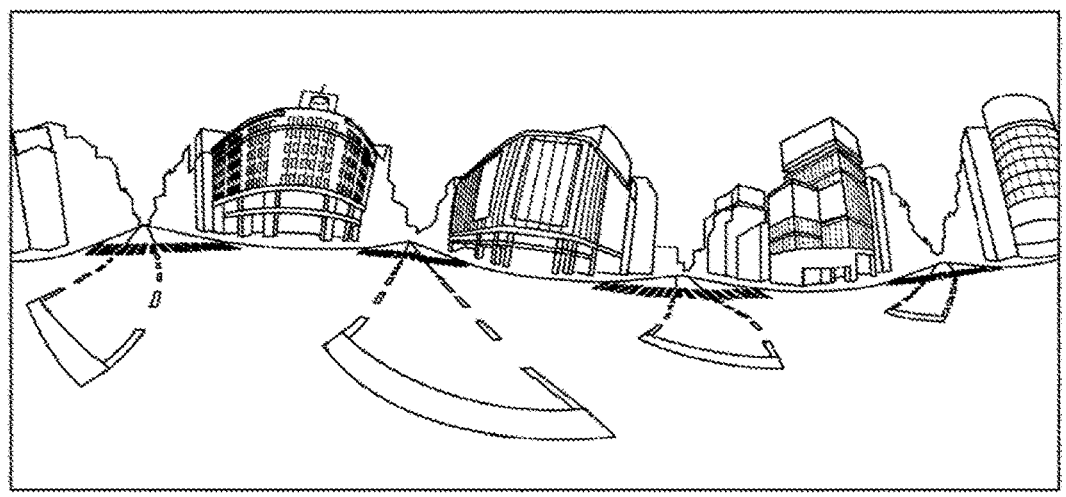

Next, a description will be given regarding images captured by the capturing device 1 and a composite image thereof with reference to FIGS. 4-1 to 4-3. FIG. 4-1 is a view illustrating a hemispheric image (the front side) captured by the capturing device, FIG. 4-2 is a view illustrating a hemispheric image (the rear side) captured by the capturing device, and FIG. 4-3 is a view illustrating an image expressed by Mercator projection (hereinafter, referred to as an "Mercator image").

As illustrated in FIG. 4-1, the image obtained by the imaging element 103a becomes the hemispheric image (the front side) curved by a fisheye lens 102a to be described later. In addition, the image obtained by the imaging element 103b becomes the hemispheric image (the rear side) curved by a fisheye lens 102b to be described later as illustrated in FIG. 4-2. Further, the hemispheric image (the front side), and the hemispheric image (the rear side) inverted by 180 degrees are composed by the capturing device 1, whereby the Mercator image is created as illustrated in FIG. 4-3.

Figures 1, 5:
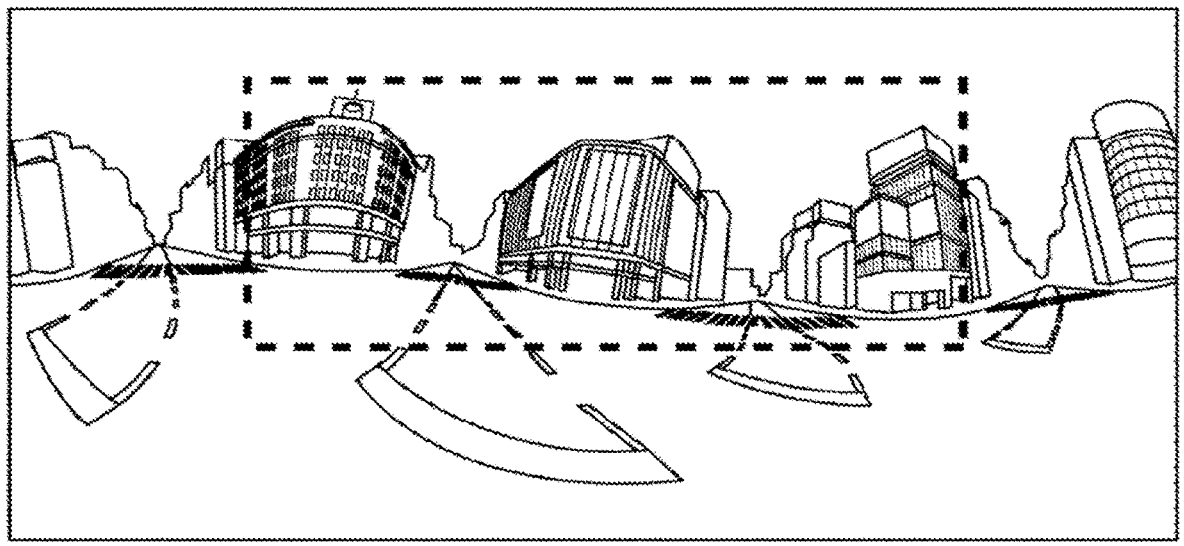
Figures 2, 5:
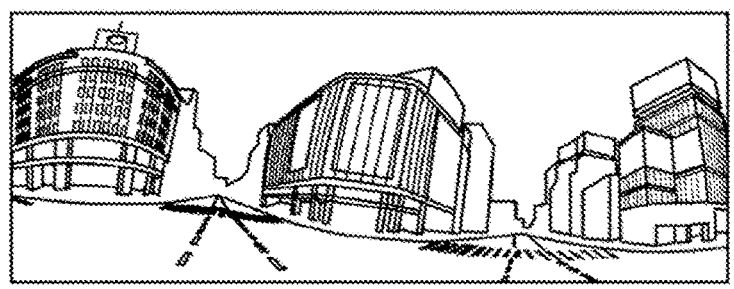

Next, a description will be given regarding data of a sharing selection image to be transmitted to the communication terminal 3 from the capturing 1 with reference to FIGS. 5-1, 5-2 and 6. FIG. 5-1 is a view illustrating the image expressed by the Mercator projection including, as a part, a sharing selection image, and FIG. 5-2 is a view illustrating the sharing selection image. In addition, FIG. 6 is a view of a captured image selection list illustrating the sharing selection image.

The sharing selection image data as illustrated in FIG. 5-2 is created by the capturing device 1 using the part indicated by a broken line on the Mercator image illustrated in FIG. 5-1. The sharing selection image data is transmitted from the capturing device 1 to the communication terminal 3a. Further, a sharing image selection list SL showing each sharing selection image CE is displayed on a display 315 of the communication terminal 3a as illustrated in FIG. 6. For example, a building in a commercial district is displayed as the sharing selection image CE, and a date and time (11:21, Sep. 20, 2011) on which an original image of the sharing selection image CE (the captured image illustrated in FIG. 5-1) is captured is displayed.

Next, the outline of a process of registering and acquiring image data according to the present embodiment will be described with reference to FIGS. 6 to 14. FIG. 6 is the view of the captured image selection list showing the sharing selection images. In addition, FIG. 7 is a diagram illustrating the process of registering and acquiring image data. FIG. 7 illustrates a state where browsing software of a full-spherical panoramic image is installed in the communication terminal 3a, but is not installed in the communication terminal 3b.

Figure 6:
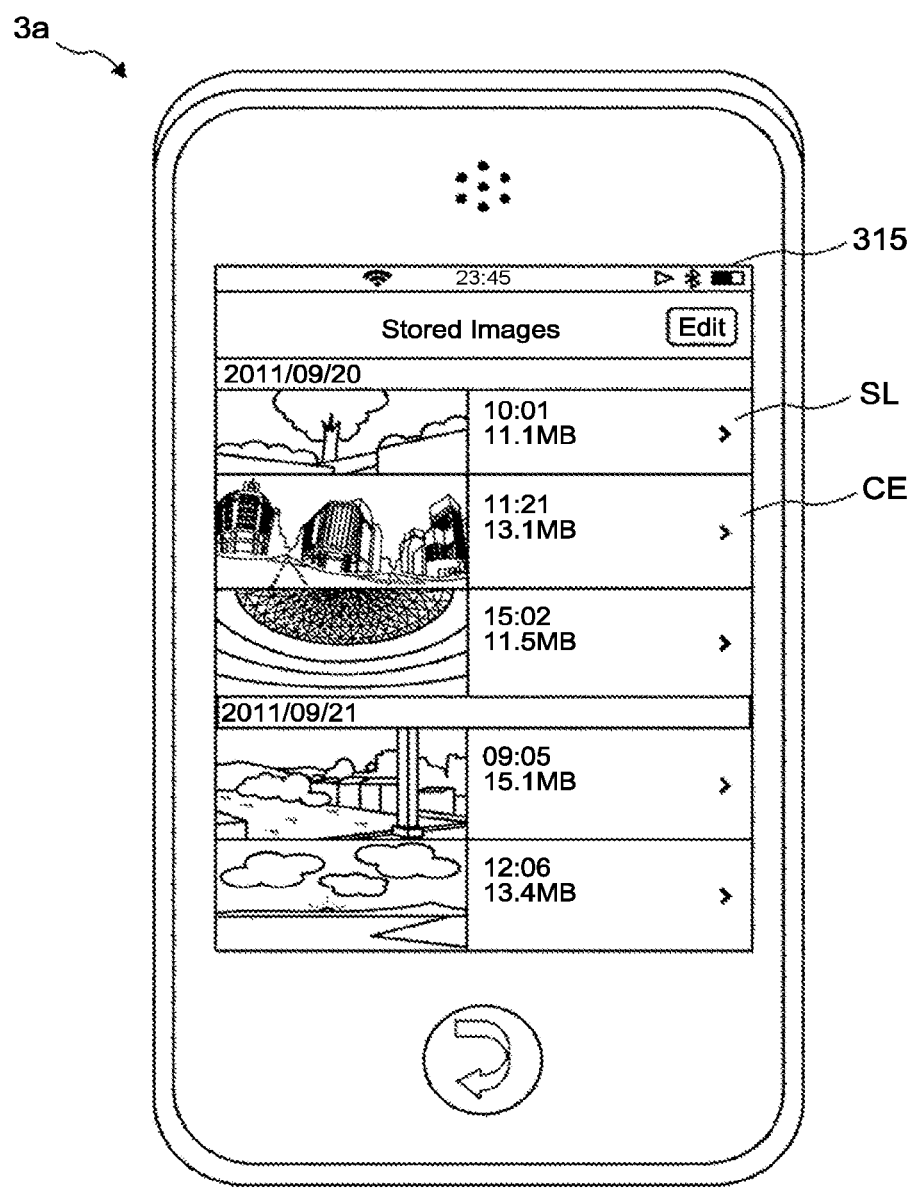
FIG. 6 is a view of a captured image selection list showing the sharing selection images.
Figure 7:
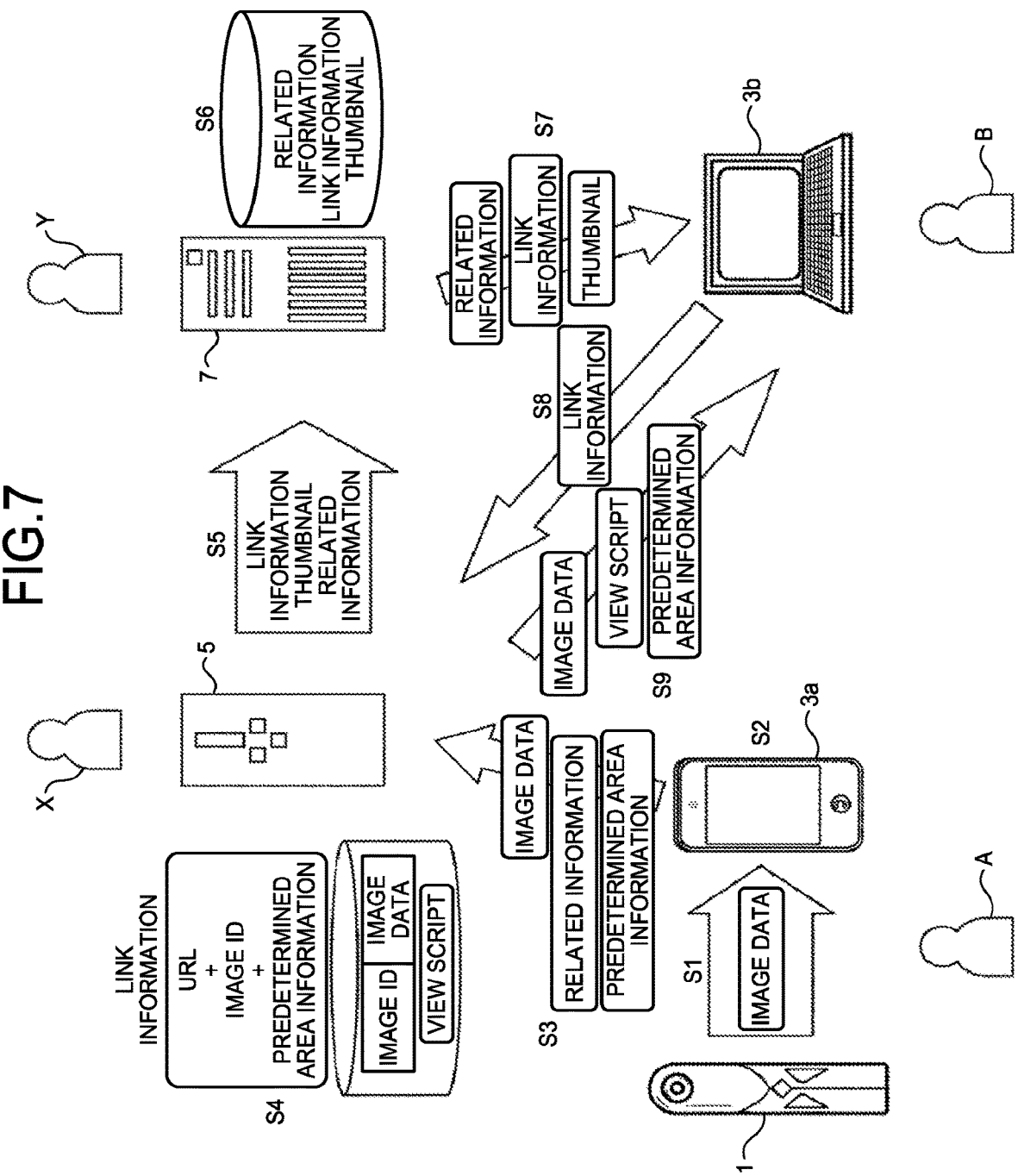
FIG. 7 is a diagram illustrating the outline of a process of registering and acquiring image data.
Figure 8:
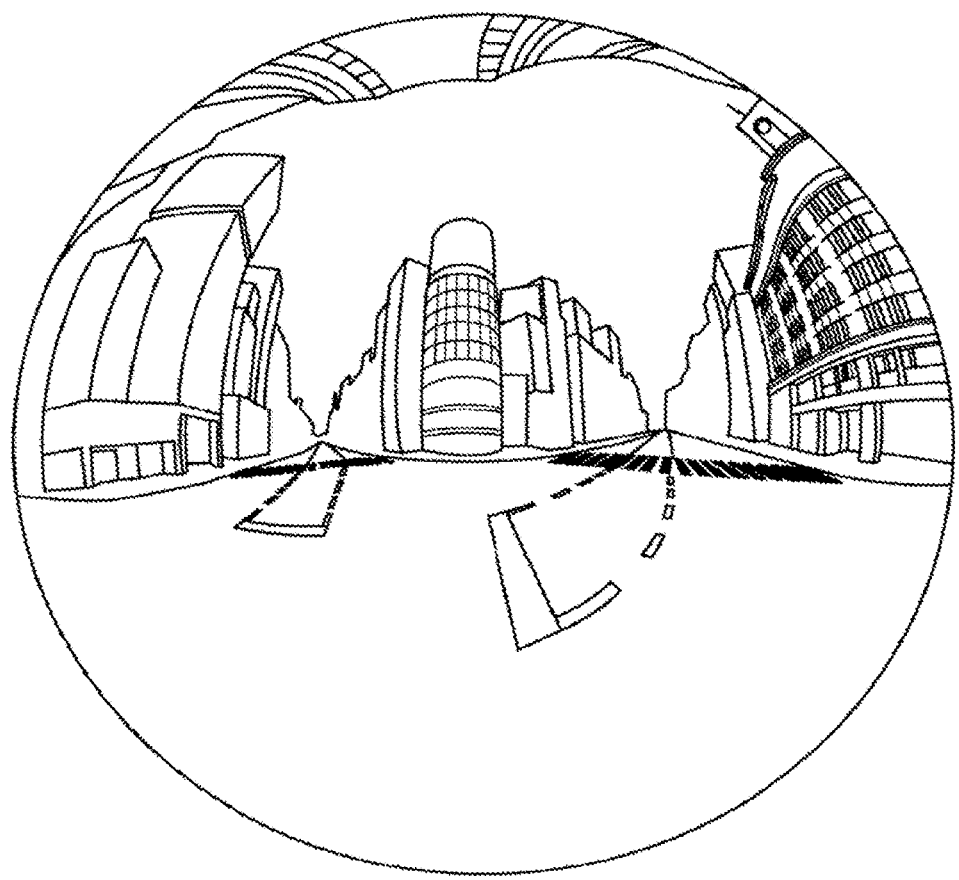
FIG. 8 is a view illustrating a full-spherical panoramic image.

First, when the user A selects the desired sharing selection image CE illustrated in FIG. 6, the communication terminal 3a acquires, from the capturing device 1, the original image (captured image) of the sharing selection image CE selected as above (Step S1). Further, the communication terminal 3a uses open graphics library for embedded systems (OpenGL ES) to create a full-spherical panoramic image as illustrated in FIG. 8 from the captured image (the Mercator image) illustrated in FIG. 5-1 (Step S2). The OpenGL ES is a graphics library which is used to visualize 2-dimensions (2D) and 3-dimensions (3D) data. FIG. 8 is a view illustrating a full-spherical panoramic image. The full-spherical panoramic image may be a still image or a moving image. For example, the full-spherical panoramic image as illustrated in FIG. 8 is created by pasting the Mercator image illustrated in FIG. 5-1 on a stereo sphere.

Figure 9:
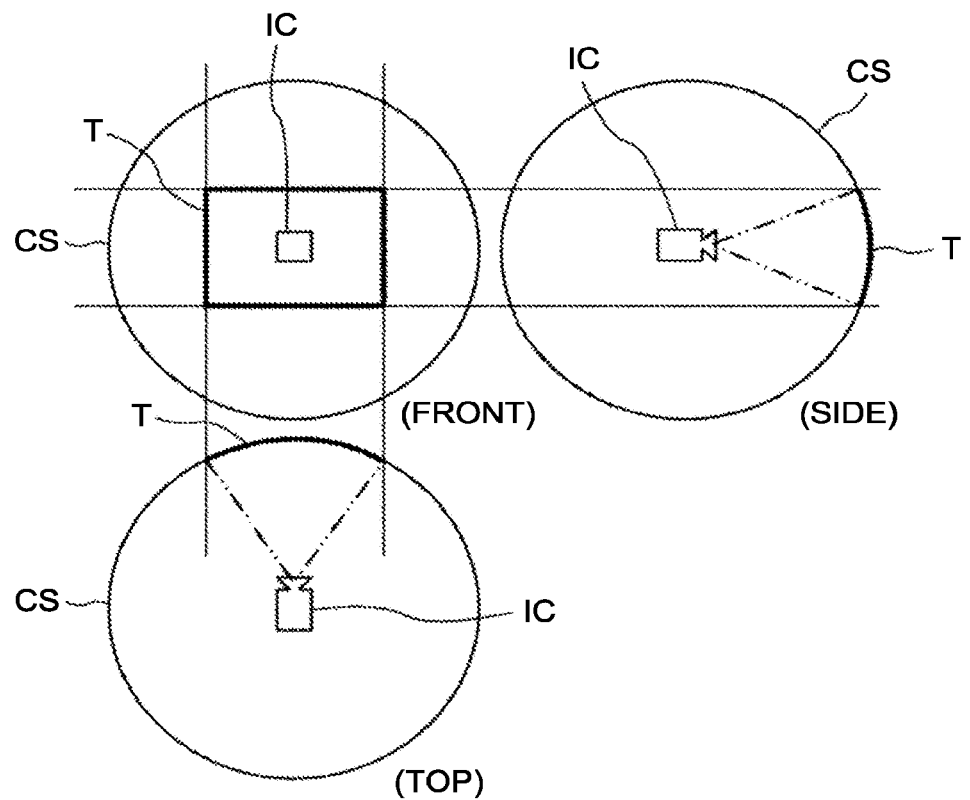
FIG. 9 is a view illustrating positions of a virtual camera and a predetermined area when the full-spherical panoramic image is formed in a three-dimensional sphere.
Figures 1, 10:
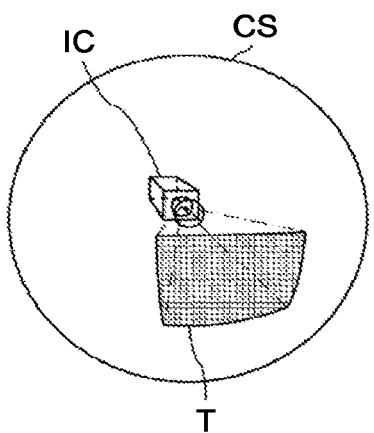
Figures 2, 10:
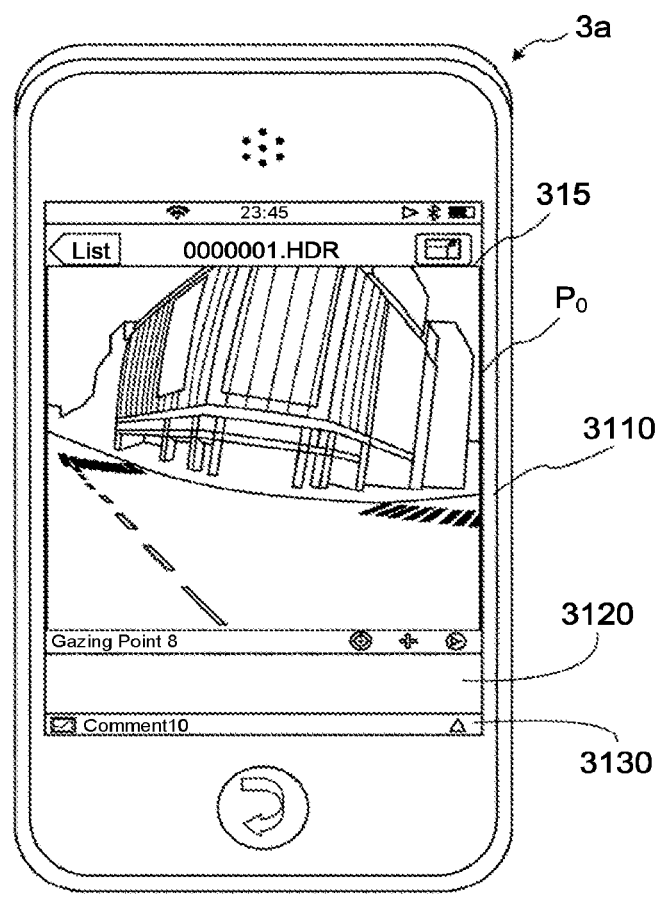

Next, a description will be given regarding a process of creating and displaying an image of a predetermined area (hereinafter, referred to as a "predetermined area image") in the full-spherical panoramic image with reference to FIGS. 7, 9, 10-1 and 10-2. FIG. 9 is a view illustrating positions of a virtual camera and the predetermined area when the full-spherical panoramic image is formed in a three-dimensional sphere. A virtual camera IC corresponds to a position of a viewpoint of the user who views the image with respect to the full-spherical panoramic image displayed as the three-dimensional sphere. FIG. 10-1 is a stereoscopic view of FIG. 9, and FIG. 10-2 is a view illustrating the communication terminal with the display on which the predetermined area image is displayed. The full-spherical panoramic image illustrated in FIG. 8 is expressed using a three-dimensional stereo sphere CS. When the full-spherical panoramic image generated in this manner is assumed to be the stereo sphere CS, the virtual camera IC is positioned at a center of the full-spherical panoramic image as illustrated in FIG. 9 and can perform upward, downward, rightward, and leftward rotation from the center and three-axis rotation of rotation (ROLL) from the viewpoint of the center. A predetermined area T in the full-spherical panoramic image is specified by predetermined area information on the position of the virtual camera IC in the full-spherical panoramic image. The predetermined area information is represented by a coordinate x (rH), a coordinate y (rV), and an angle of view α (angle). In addition, zooming of the predetermined area T can be expressed by widening or narrowing a range (arc) of the angle of view α.

Further, the image of the predetermined area T in the full-spherical panoramic image as illustrated in FIG. 10-1 is displayed on the display 315 of the communication terminal 3a as the predetermined area image as illustrated in FIG. 10-2. In this case, the predetermined area image is a partial image $P_0$ which is a part of the full-spherical panoramic image. The partial image $P_0$ is an image expressed using predetermined area information (x, y, α)=(0, 0, 34) of initial setting (default) in the full-spherical panoramic image illustrated in FIG. 8.

Displayed on the display 315A are an image display area 3110 to display the predetermined area image, a thumbnail display area 3120 to display a thumbnail of the predetermined area image, a comment display area 3130 to display a property name, a name of the user A, and the like.

Figure 11:
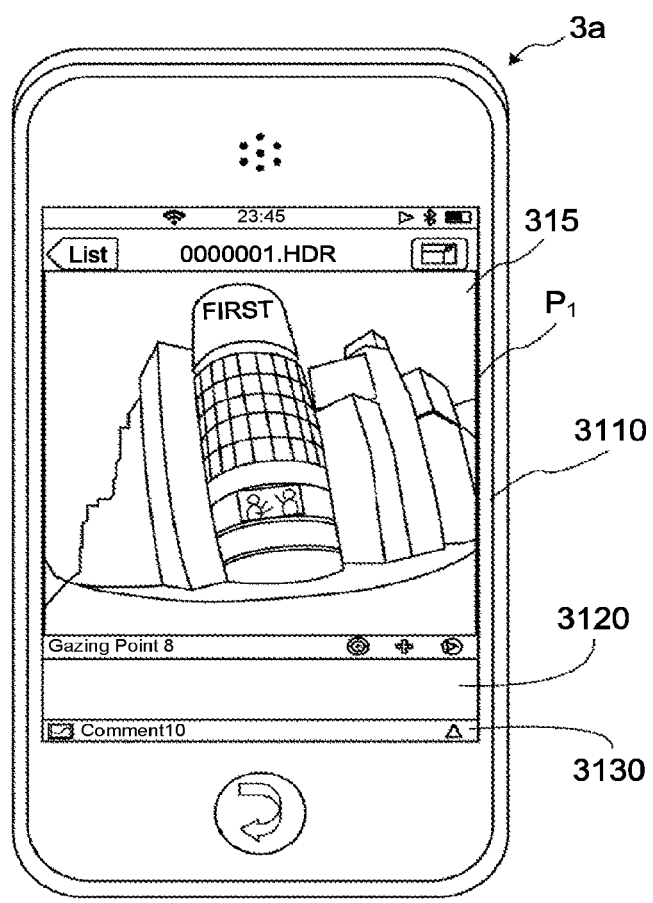
FIG. 11 is a view illustrating the communication terminal with the display on which an image of a predetermined area is displayed.

Next, when the user A desires to display a predetermined area image of an interest on the display 315, if the communication terminal 3a can be operated using a touch panel, the desired predetermined area image as illustrated in FIG. 11 can be displayed by moving a finger up, down, right, and left while touching the display 315 with the finger. In addition, if the communication terminal 3a is a personal computer or the like, the desired predetermined area image as illustrated in FIG. 11 can be displayed by performing input operation using a mouse or the like and moving the mouse up, down, right, and left. The predetermined area image in this case is a partial image $P_1$ which is a part of the full-spherical panoramic image.

Figure 12:
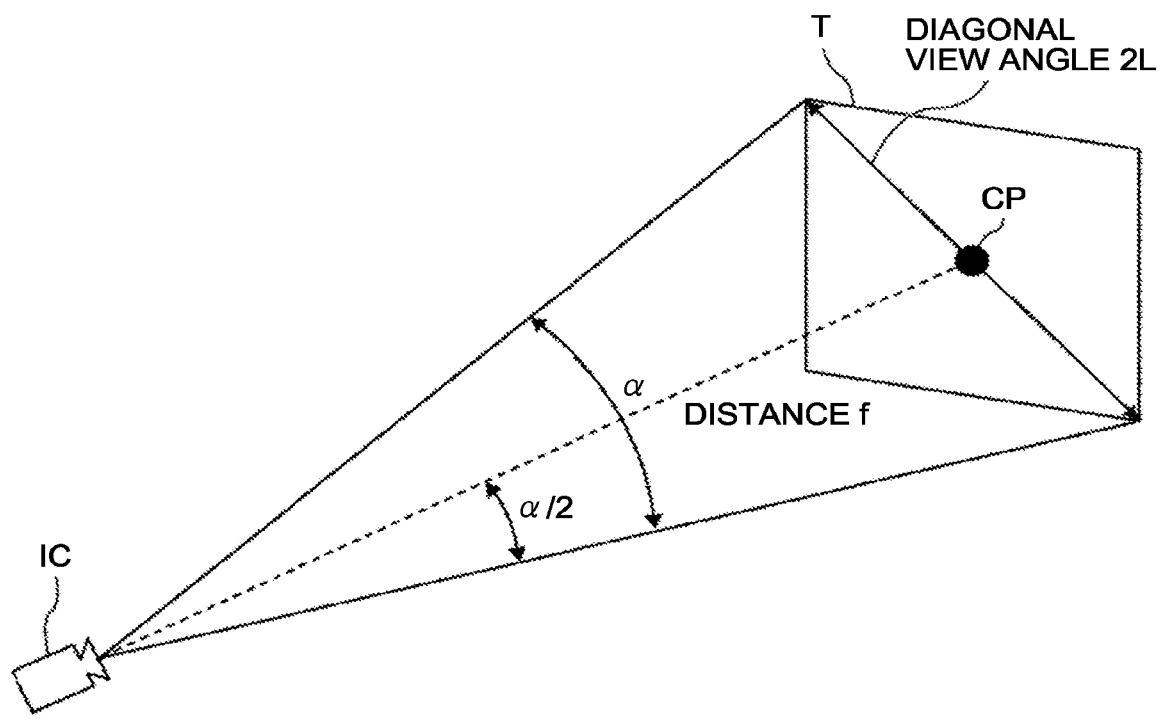
FIG. 12 is a diagram illustrating a relationship between predetermined area information and the predetermined area image.

Herein, a relationship between the predetermined area information and the predetermined area image will be described with reference to FIG. 12. FIG. 12 is a diagram illustrating the relationship between the predetermined area information and the predetermined area image.

As illustrated in FIG. 12, a center point CP in the case of a diagonal view angle 2L of the predetermined area T expressed using the angle of view a of the virtual camera IC serves as a (x, y) parameter of the predetermined area information. In the present embodiment, when the user A operates the display 315 while touching the display with the finger to cause the predetermined area image (the partial image $P_1$) as illustrated in FIG. 11 to be shown, for example, the predetermined area information (x, y, α)=(230, 439, 35) is obtained.

In addition, f represents a distance between the virtual camera IC and the center point CP. In FIG. 12A, a trigonometric function expressed by the following Formula (1) is generally established.

$$Lf=\tan(\alpha/2) \qquad \text{(Formula 1)}$$

Figure 13:
FIG. 13 is a view illustrating content of link information.

Next, as illustrated in FIG. 7, the communication terminal 3a transmits image data and related information to the image management system 5 via the communication network 9, and then, also transmits the predetermined area information (Step S3). This image data is the Mercator image illustrated in FIG. 4-3. The related information is information relating to a property, for example, a property name, price, area, a dwelling year, address, and the like. The predetermined area information is predetermined area information (x=230, y=439, α=35) representing the predetermined area image (partial image $P_1$) illustrated in FIG. 11. Accordingly, the image management system 5 assigns, to the image data, image identification (ID) for identifying the image data and manages the image data and the image ID in an associated manner (Step S4). Further, the image management system 5 creates link information (Step S4). This link information includes a URL of the image management system 5, the image ID, and the predetermined area information as illustrated in FIG. 13. Furthermore, the image management system 5 creates thumbnail data of the image data (Step S4). The URL is an example of specific information. In addition, the image management system 5 manages a view script. This view script is a program capable of causing a special image to be displayed even in a browser which is not compatible with JavaScript (registered trademark) or restricts a function in order to enhance appearance of the special image and operability according to recent Web service. In the present embodiment, the full-spherical panoramic image is used as an example of the special image.

Next, the image management system 5 transmits the link information and the thumbnail data to the link information management system 7 (Step S5). In response to this, the link information management system 7 manages the link information, the thumbnail data, and the related information in an associated manner (Step S6). Not only the related information but also a related image is managed in an associated manner. The related image includes a floor plan of the property. The floor plan is created by the user A or the administrator Y. For example, when the user A creates the floor plan, data of the floor plan is provided to the administrator Y by the user A. As a providing method, the related image is provided together with the related information through the image management system 5 using an electronic mail or the image sharing system.

Further, when the communication terminal 3b of the user B is connected to the link information management system 7 and requests display of a property details screen, the link information management system 7 transmits the related information, the link information, and the thumbnail data to the communication terminal 3b of the user B (Step S7).

In this case, a property details screen 3200 as illustrated in FIG. 14 is displayed in the communication terminal 3b. User personal information (herein, a "realtor name", "address" and "a phone number" of the realtor) 3210a and related information 3210b of a property, a floor plan 3220 as a related image of the property, a display area 3230 of a full-spherical panoramic image, a thumbnail display area 3240, and a plurality of thumbnails (3240a, 3240b, 3240c) of the single property are displayed on the property details screen 3200. That is, each of the thumbnails (3240a, 3240b, 3240c) is an image obtained by downsizing the predetermined area image (the partial image $P_1$) illustrated in FIG. 11, and is not an image obtained by downsizing the predetermined area image (the partial image $P_0$) illustrated in FIG. 10-2.

Next, when the user B operates the communication terminal 3b and selects a desired thumbnail (herein, the thumbnail 3240a), the communication terminal 3b transmits the link information to the image management system 5 (Step S8). In response to this, the image management system 5 transmits the image data corresponding to the image ID extracted from the link information, the predetermined area information extracted from the link information, and the view script to the communication terminal 3b (Step S9). Further, a process of specifying the predetermined area T in the image data using the view script is performed in the communication terminal 3b. Accordingly, not the full-spherical panoramic image as illustrated in FIG. 8 but the predetermined area image in the full-spherical panoramic image is displayed in the communication terminal 3b as illustrated in the display area 3230 of the full-spherical panoramic image in FIG. 15.

<<Hardware Configuration of Embodiment>>

Next, hardware configurations of the capturing device, the communication terminal, and the image management system will be described in detail with reference to FIGS. 16 to 18.

First, the hardware configuration of the capturing device 1 will be described with reference to FIG. 16. Incidentally, FIG. 16 is a hardware configuration view of the capturing device. Hereinafter, the capturing device 1 is assumed to be an omnidirectional capturing device which uses two imaging elements, but the number of imaging elements may be another value of three or more. In addition, the capturing device 1 is not necessarily a device dedicated for omnidirectional capturing, and a retrofit omnidirectional capturing unit may be attached to a general digital camera or smartphone to have substantially the same function as the capturing device 1.

Figure 16:
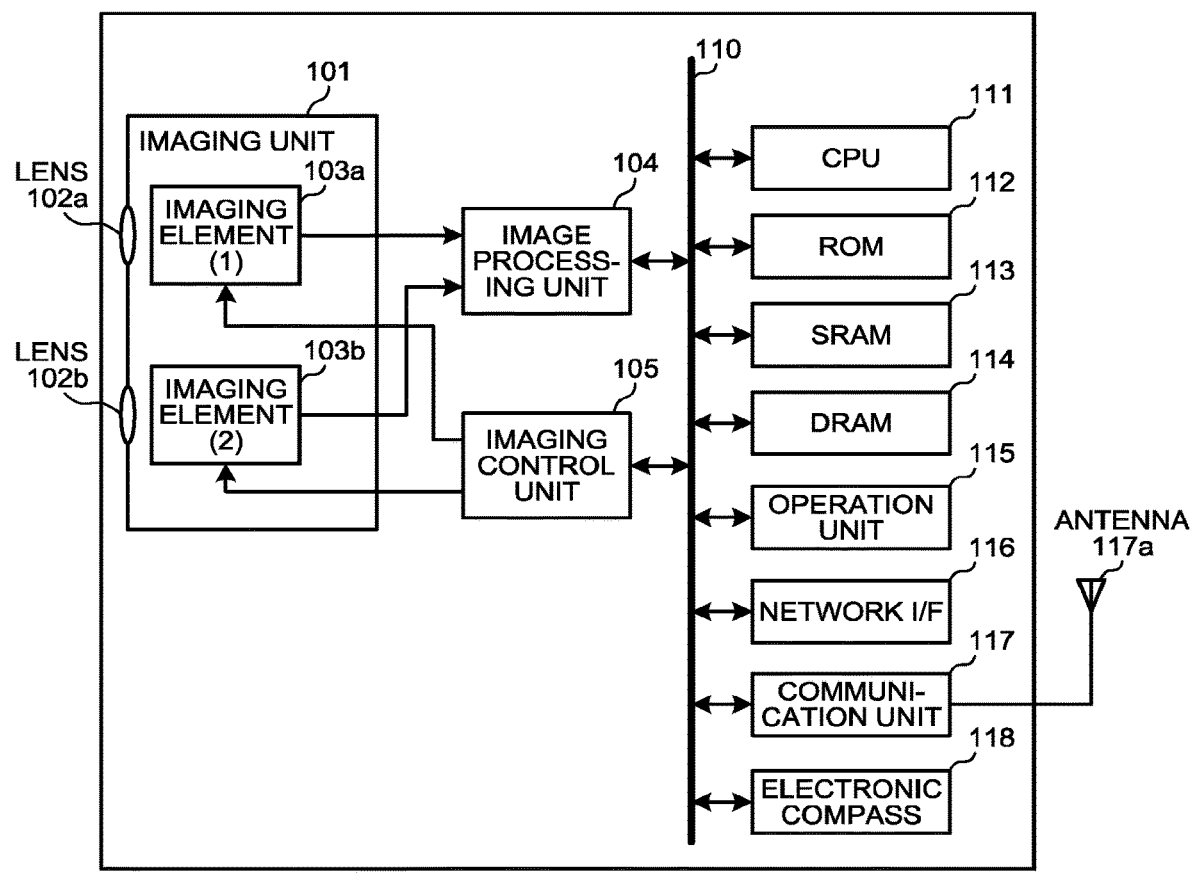
FIG. 16 is a hardware configuration view of a capturing device.

As illustrated in FIG. 16, the capturing device 1 is configured of an imaging unit 101, an image processing unit 104, an imaging control unit 105, a CPU (central processing unit) 111, a ROM (read only memory) 112, an SRAM (static random access memory) 113, a DRAM (dynamic random access memory) 114, the operation unit 115, a network I/F 116, a communication unit 117, an antenna 117a, and an electronic compass 118.

Among these, the imaging unit 101 includes wide-angle lenses (so-called fisheye lens) 102a and 102b having an angle of view of 180° or more to image each hemispheric image, and the two imaging elements 103a and 103b which are provided in response to the wide-angle lenses, respectively. The imaging elements 103a and 103b include an image sensor, such as a CMOS (complementary metal oxide semiconductor) sensor and a CCD (charge coupled device) sensor, which converts an optical image obtained by the fisheye lens into image data of an electrical signal and outputs the converted data, a timing generation circuit which generates a horizontal or vertical synchronization signal and a pixel clock of the image sensor, a register group in which various commands and parameters required for operation of the imaging element are set, and the like.

Each of the imaging elements 103a and 103b of the imaging unit 101 is connected to an image processing unit 104 via a parallel I/F bus. Meanwhile, the imaging elements 103a and 103b of the imaging unit 101 are connected to the imaging control unit 105 via another serial I/F bus (an I2C bus or the like). The image processing unit 104 and the imaging control unit 105 are connected to the CPU 111 via a bus 110. Further, the bus 110 is also connected with the ROM 112, the SRAM 113, the DRAM 114, the operation unit 115, the network I/F 116, the communication unit 117, the electronic compass 118, and the like.

The image processing unit 104 takes the image data output from the imaging elements 103a and 103b via the parallel I/F bus, performs predetermined processing on the respective image data, and then, creates data of the Mercator image as illustrated in FIG. 4-3 by a process of composing these image data.

The imaging control unit 105 sets the command and the like to the register groups of the imaging elements 103a and 103b using the imaging control unit 105 as a master device and the imaging elements 103a and 103b as slave devices, and using the I2C bus. The necessary command or the like is received from the CPU 111. In addition, the imaging control unit 105 takes status data of the register groups of the imaging elements 103a and 103b similarly using the I2C bus and transmits the data to the CPU 111.

In addition, the imaging control unit 105 instructs the imaging elements 103a and 103b to output the image data at a timing at which a shutter button of the operation unit 115 is pressed. Depending on capturing devices, there is also a case of including a preview display function using a display or a function corresponding to moving image display. In this case, the output of the image data from the imaging elements 103a and 103b is continuously performed at a predetermined frame rate (frames/minute).

In addition, the imaging control unit 105 also functions as a synchronization control unit which obtains synchronization of output timings of the image data of the imaging elements 103a and 103b in cooperation with the CPU 111 as will be described later. Incidentally, the capturing device 1 is not provided with a display unit in the present embodiment, but may be provided with the display unit.

The CPU 111 controls the overall operation of the capturing device 1 and executes a required process. The ROM 112 stores various programs for the CPU 111. The SRAM 113 and the DRAM 114 are work memories, and store a program to be executed by the CPU 111, data in the middle of being processed, and the like. In particular, the DRAM 114 stores image data in the middle of being processed by the image processing unit 104 and data of a processed Mercator image.

The operation unit 115 is a generic term of various types of operation buttons, a power switch, a shutter button, and a touch panel having both functions of a display and operation. The user inputs various capturing modes, capturing conditions, and the like by operating the operation button.

The network I/F 116 is a generic term of interface circuits (USB I/F and the like) between externally-attached media such as an SD card and a personal computer and the like. In addition, it is also considered a case where any wired or wireless network interface is given as the network I/F 116 regardless. The Mercator image data stored in the DRAM 114 is recorded in the externally-attached media via the network I/F 116 or transmitted to an external device such as the communication terminal 3 via the network I/F 116 serving as the network I/F if necessary.

The communication unit 117 performs communication with the external device such as the communication terminal 3 based on the short-range wireless technology, such as WiFi (wireless fidelity) and NFC, via the antenna 117a provided in the capturing device 1. The Mercator image data can be also transmitted to the external device such as the communication terminal 3 using the communication unit 117.

The electronic compass 118 calculates an azimuth and inclination (Roll rotation angle) of the capturing device 1 based on magnetism of the earth, and outputs azimuth and inclination information. This azimuth and inclination information is an example of metadata according to Exif, and is used for image processing such as image correction of a captured image. The metadata also includes the thumbnail of the image data, the capturing date and time of the image, and data capacity of the image data.

Next, the hardware configuration of the communication terminal 3a will be described with reference to FIG. 17. Incidentally, FIG. 17 is a hardware configuration view of the communication terminal 3a in the case of the smartphone.

Figure 17:
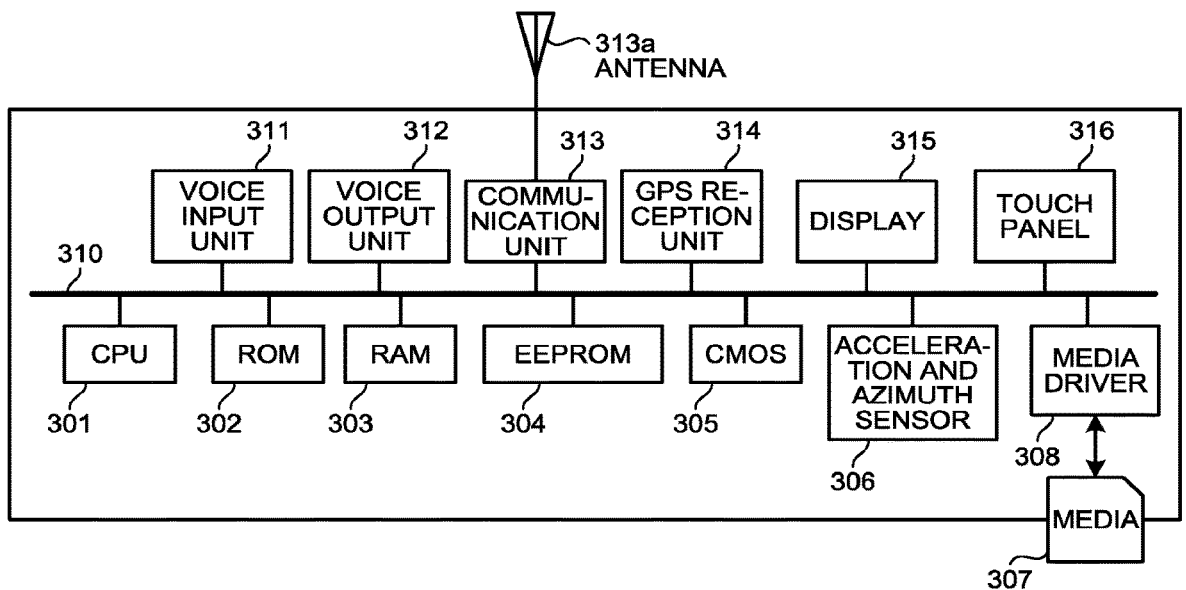
FIG. 17 is a hardware configuration view of a communication terminal in the case of a smartphone.

As illustrated in FIG. 17, the communication terminal 3a includes a CPU 301 which controls the overall operation of the communication terminal 3a, a ROM 302 which stores a basic input and output program, a RAM (random access memory) 303 which is used as a work area of the CPU 301, an EEPROM (electrically erasable and programmable rom) 304 which performs read or write of data according to control of the CPU 301, a CMOS sensor 305 serving as an imaging element which images a subject according to control of the CPU 301 to obtain image data, an electronic magnetic compass and a gyro compass which detect terrestrial magnetism, various acceleration and azimuth sensors 306 such as an acceleration sensor, and a media driver 308 which controls read or write (store) of data with respect to recording media 307 such as a flash memory. Further, it is configured such that the recording media 307 to read data that has been already recorded or newly write and store data according to control of the media driver 308 are attachable and detachable.

Incidentally, an operating system (OS) executed by the CPU 301, other programs, and various types of data are stored in the EEPROM 304. In addition, a CCD sensor may be used instead of the CMOS sensor 305.

Further, the communication terminal 3a includes a voice input unit 311 which converts voice into a voice signal, a voice output unit 312 which converts a voice signal into voice, an antenna 313a, a communication unit 313 which performs communication with the nearest base station 9a and the like by a wireless communication signal using the antenna 313a, a GPS reception unit 314 which receives a GPS signal including positional information (latitude, longitude, and altitude) of the communication terminal 3a by a GPS (global positioning systems) satellite and an IMES (indoor messaging system) serving as an indoor GPS, a display 315 such as liquid crystal and an organic EL which displays an image of a subject, various icons, and the like, a touch panel 316, which is placed on the display 315 and configured using a pressure sensitive type or an electrostatic type panel, and detects a touch position on the display 315 according to touch using a finger or a touch pen, and a bus line 310 such as an address bus and a data bus for electrical connection of the above-described respective units.

Incidentally, the voice input unit 311 includes a microphone to input voice, and the voice output unit 312 includes a speaker to output voice.

Next, hardware configurations of the communication terminal 3b, the image management system 5, and the link information management system 7 in the case of a notebook PC will be described with reference to FIG. 18. Incidentally, FIG. 18 is a hardware configuration view of the communication terminal, the image management system 5, and the link information management system 7 in the case of the notebook PC. Since all the communication terminal 3b, the image management system 5, and the link information management system 7 are general computers, the configuration of the image management system 5 will be described, and the configurations of the communication terminal 3b and the link information management system 7 will not be described hereinafter.

Figure 18:
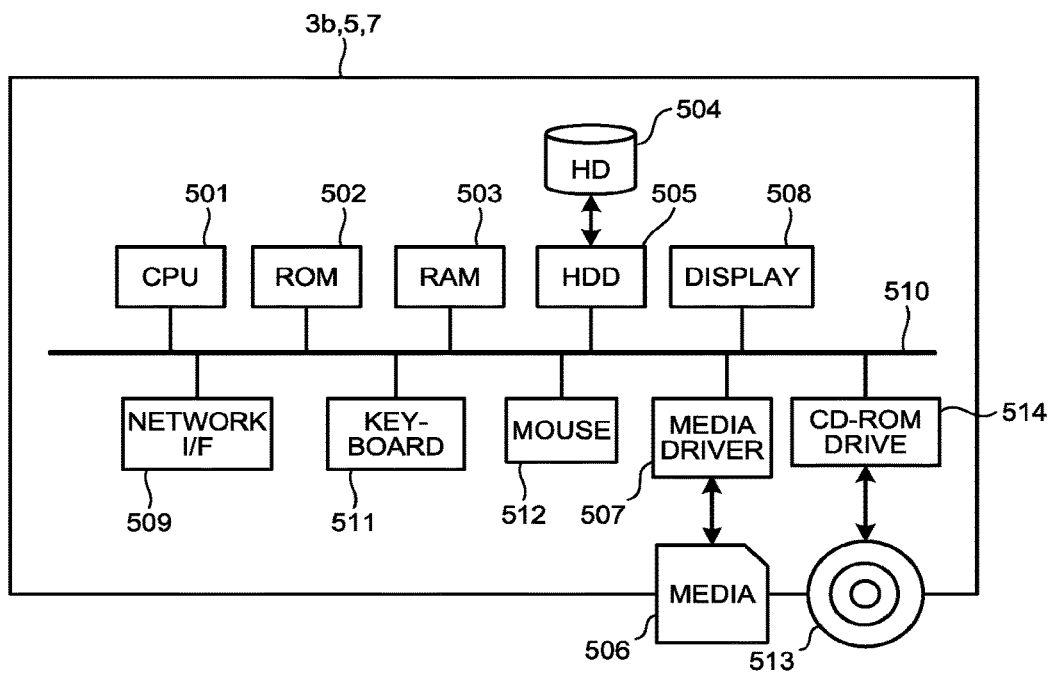
FIG. 18 is a hardware configuration view of a communication terminal, an image management system 5, and a link information management system 7 in the case of a notebook PC.

The image management system 5 includes a CPU 501 which controls the overall operation of the image management system 5, a ROM 502 which stores a program used to drive the CPU 501 such as an IPL, a RAM 503 which is used as work area of the CPU 501, an HD 504 which stores various data such as a program of the image management system 5, an HDD (hard disk drive) 505 which controls read or write of various data with respect to the HD 504 according to control of the CPU 501, a media driver 507 which controls read or write (store) of data with respect to the recording media 506 such as a flash memory, a display 508 which displays various types of information such as a cursor, a menu, a window, a letter, an image, and the like, a network I/F 509 for data communication using the communication network 9, a keyboard 511 including a plurality of keys for input of a letter, a numeric value, various instructions, and the like, a mouse 512 which performs selection and execution of various instructions, selection of a processing target, movement of a cursor, and the like, a CD-ROM drive 514 which controls read or write of various data with respect to a CD-ROM (compact disc read only memory) 513 as an example of a detachable recording media, and a bus line 510 such as an address bus and a data bus for electrical connection of the above-described respective components as illustrated in FIG. 18.

<<Functional Configuration of Embodiment>>

Figure 19:
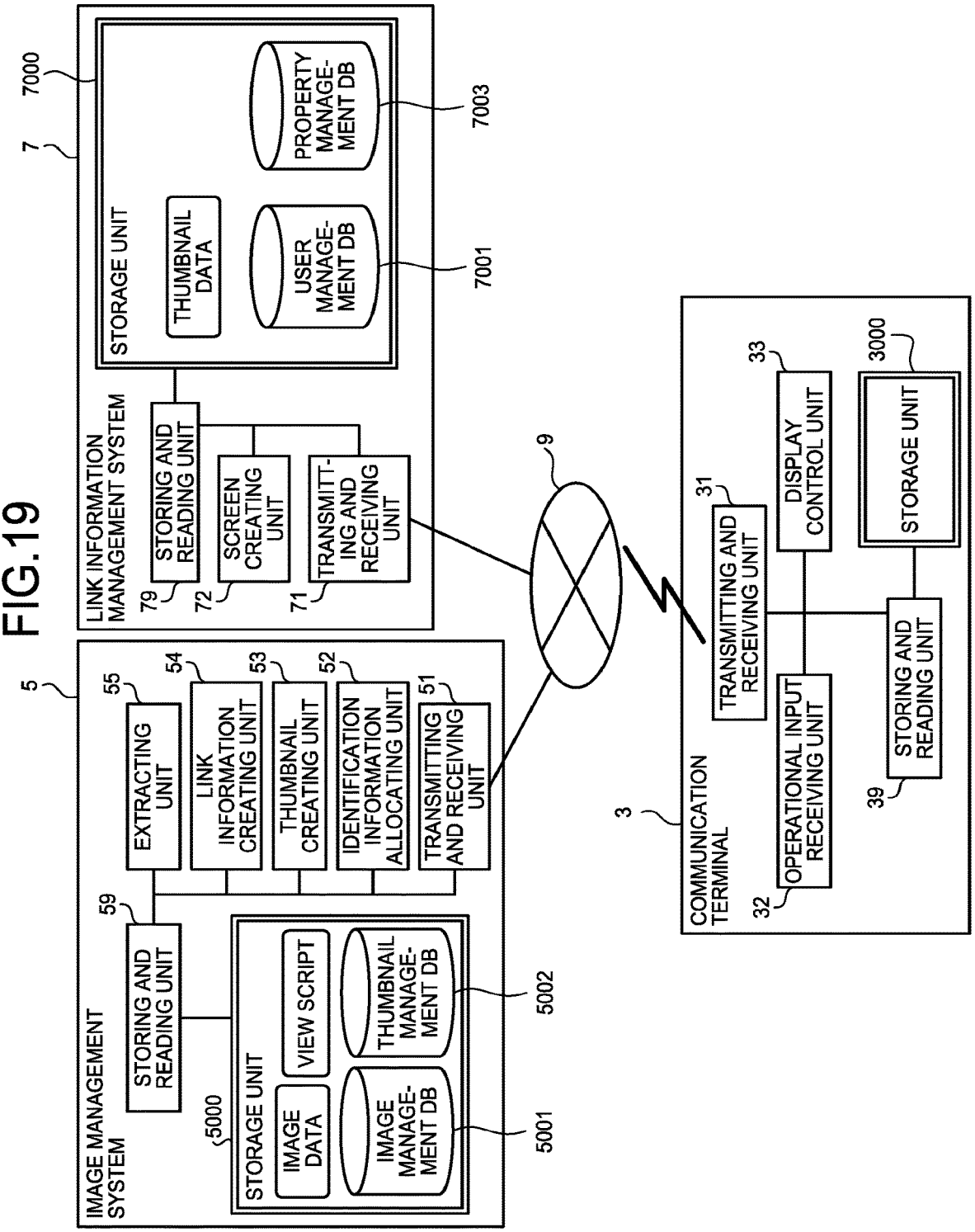
FIG. 19 is a functional block diagram of a communication terminal, an image management system, and a link information management system according to an embodiment.

Next, a functional configuration of the present embodiment will be described with reference to FIG. 19. FIG. 19 is each functional block diagram of the communication terminal 3, the image management system 5, and the link information management system 7 forming a part of the image sharing system according to the present embodiment. In FIG. 19, the communication terminal 3, the image management system 5, and the link information management system 7 can perform data communication via the communication network 9.

<Functional Configuration of Communication Terminal>

As illustrated in FIG. 19, the communication terminal 3 includes a transmitting and receiving unit 31, an operational input receiving unit 32, a display control unit 33, and a storing and reading unit 39. These respective units are functions or units which are implemented by any one of the respective components illustrated in FIG. 16 that operates depending on a command from the CPU 111 according to a program for the communication terminal 3 of the SRAM 113 loaded on the DRAM 114.

In addition, the communication terminal 3 includes a storage unit 3000 which is constructed using the ROM 112, the SRAM 113, and the DRAM 114 illustrated in FIG. 16.

(Each Functional Configuration of Communication Terminal)

Next, the respective functional configurations of the communication terminal 3 will be described in more detail with reference to FIGS. 17 and 19.

The transmitting and receiving unit 31 of the communication terminal 3 is implemented mainly by processing of the communication unit 313 and the CPU 301 illustrated in FIG. 17, and performs transmission and reception of various data (or information) with the image management system 5 or the link information management system 7 via the communication network 9.

The operational input receiving unit 32 is implemented mainly by processing of the touch panel 316 and the CPU 301, and receives various types of selection or input from the user.

The display control unit 33 is implemented mainly by processing of the CPU 301, and performs control to display various images, letters and the like on the display 315.

The storing and reading unit 39 stores various data (or information) in the storage unit 3000 or read the various data (or information) from the storage unit 3000.

<Functional Configuration of Image Management System>

Next, each functional configuration of the image management system 5 will be described in detail with reference to FIGS. 18 and 19. The image management system 5 includes a transmitting and receiving unit 51, an identification information allocating unit 52, a thumbnail creating unit 53, a link information creating unit 54, an extracting unit 55, and a storing and reading unit 59. These respective units are functions or units which are implemented by any one of the respective components illustrated in FIG. 18 that operates depending on a command from the CPU 501 according to a program for the image management system 5 of the HD 504 loaded on the RAM 503.

In addition, the image management system 5 includes a storage unit 5000 which is constructed by the RAM 503 and the HD 504 illustrated in FIG. 18. An image management DB 5001 configured using an image management table to be described later is constructed in the storage unit 5000. A thumbnail management DB 5002 configured using a thumbnail management table to be described later is constructed in the storage unit 5000. Further, the above-described view script is stored in the storage unit 5000.

(Image Management Table)

FIG. 20 is a conceptual diagram illustrating the image management table. In the image management table, a user ID for identifying a user, an image ID for identifying image data, and a file name of image data are stored and managed in an associated manner. This image data is data of the full-spherical panoramic image. The user ID is an example of user identification information capable of uniquely identifying the user. The user identification information also includes a service use number, an employee number, a student ID number, a national ID number based on a citizen's total numbering system. The image ID is an example of image identification information.

(Thumbnail Management Table)

FIG. 21 is a conceptual diagram illustrating the thumbnail management table. In this thumbnail management table, a thumbnail ID for identifying a thumbnail, the image ID, and a file name of thumbnail data are stored and managed in an associated manner. The thumbnail ID is an example of thumbnail identification information.

(Each Functional Configuration of Image Management System)

Next, each functional configuration of the image management system 5 will be described in detail with reference to FIGS. 18 and 19.

The transmitting and receiving unit 51 of the image management system 5 is implemented mainly by processing of the network I/F 509 and the CPU 501 illustrated in FIG. 18, and performs transmission and reception of various data (or information) with the communication terminal 3 or the link information management system 7 via the communication network 9.

The identification information allocating unit 52 is implemented mainly by processing of the CPU 501 illustrated in FIG. 18, and allocates the image ID to image data and adds the image ID to a header section of the image data in order to manage the image data of the Mercator image, for example, received by the transmitting and receiving unit 51. In addition, the identification information allocating unit 52 allocates the thumbnail ID to thumbnail data created by the thumbnail creating unit 53 and adds the thumbnail ID to a header section of the thumbnail data.

The thumbnail creating unit 53 is implemented mainly by processing of the CPU 501 illustrated in FIG. 18, and creates the thumbnail data using the predetermined area T in the image data as illustrated in FIGS. 9 to 12 based on the image data represented by the image ID received by the transmitting and receiving unit 51 and the predetermined area T represented by the predetermined area information received by the transmitting and receiving unit 51.

The link information creating unit 54 is implemented mainly by processing of the CPU 501 illustrated in FIG. 18, and creates the link information illustrated in FIG. 13 by linking an URL of the image data represented by the image ID received by the transmitting and receiving unit 51, the image ID allocated by the identification information allocating unit 52, and the predetermined area information received by the transmitting and receiving unit 51.

The extracting unit 55 is implemented mainly by processing of the CPU 501 illustrated in FIG. 18, and extracts the image ID and the predetermined area information from the link information received by the transmitting and receiving unit 51.

The storing and reading unit 59 stores various data (or information) in the storage unit 5000 or read the various data (or information) from the storage unit 5000.

<Functional Configuration of Link Information Management System>

Next, the functional configuration of the link information management system 7 will be described in detail with reference to FIGS. 18 and 19. The link information management system 7 includes a transmitting and receiving unit 71, a screen creating unit 72, and a storing and reading unit 79. These respective units are functions or means which are implemented by any one of the respective components illustrated in FIG. 18 that operates depending on a command from the CPU 501 according to a program for the link information management system 7 of the HD 504 loaded on the RAM 503.

In addition, the link information management system 7 includes a storage unit 7000 which is constructed by the RAM 503 and the HD 504 illustrated in FIG. 18. In this storage unit 7000, a user management DB 7001 configured using a user management table to be described later, an interested party management DB 7002 configured using an interested party management table, and a property management DB 7003 configured using a property management table.

(User Management Table)

FIG. 22 is a conceptual diagram illustrating the user management table. In the user management table, the user ID, a password used for user authentication, a user image (image of a store or the like) representing an image of the user, and the user personal information (the name, the address, the phone number, and the like of the user) are managed in an associated manner.

(Property Management Table)

FIG. 23 is a conceptual diagram illustrating the property management table. In the property management table, the user ID, the link information, the file name of the thumbnail data, and the above-described related information are managed in associated manner for each property ID. The property ID is an example of property identification information configured to specify the property.

(Each Functional Configuration of Link Information Management System)

Next, each functional configuration of the link information management system 7 will be described in detail with reference to FIG. 19.

The transmitting and receiving unit 71 of the link information management system 7 is implemented mainly by processing of the network I/F 509 and the CPU 501 illustrated in FIG. 18, and performs transmission and reception of various data (or information) with the communication terminal 3 or the image management system 5 via the communication network 9.

The screen creating unit 72 is implemented mainly by processing of the CPU 501 illustrated in FIG. 18, and creates the property details screen as illustrated in FIG. 14 based on the property management table.

The storing and reading unit 79 stores various data (or information) such as the image data in the storage unit 7000 or read the various data (or information) such as the image data from the storage unit 7000.

<<Process or Operation of Embodiment>>

Figure 24:
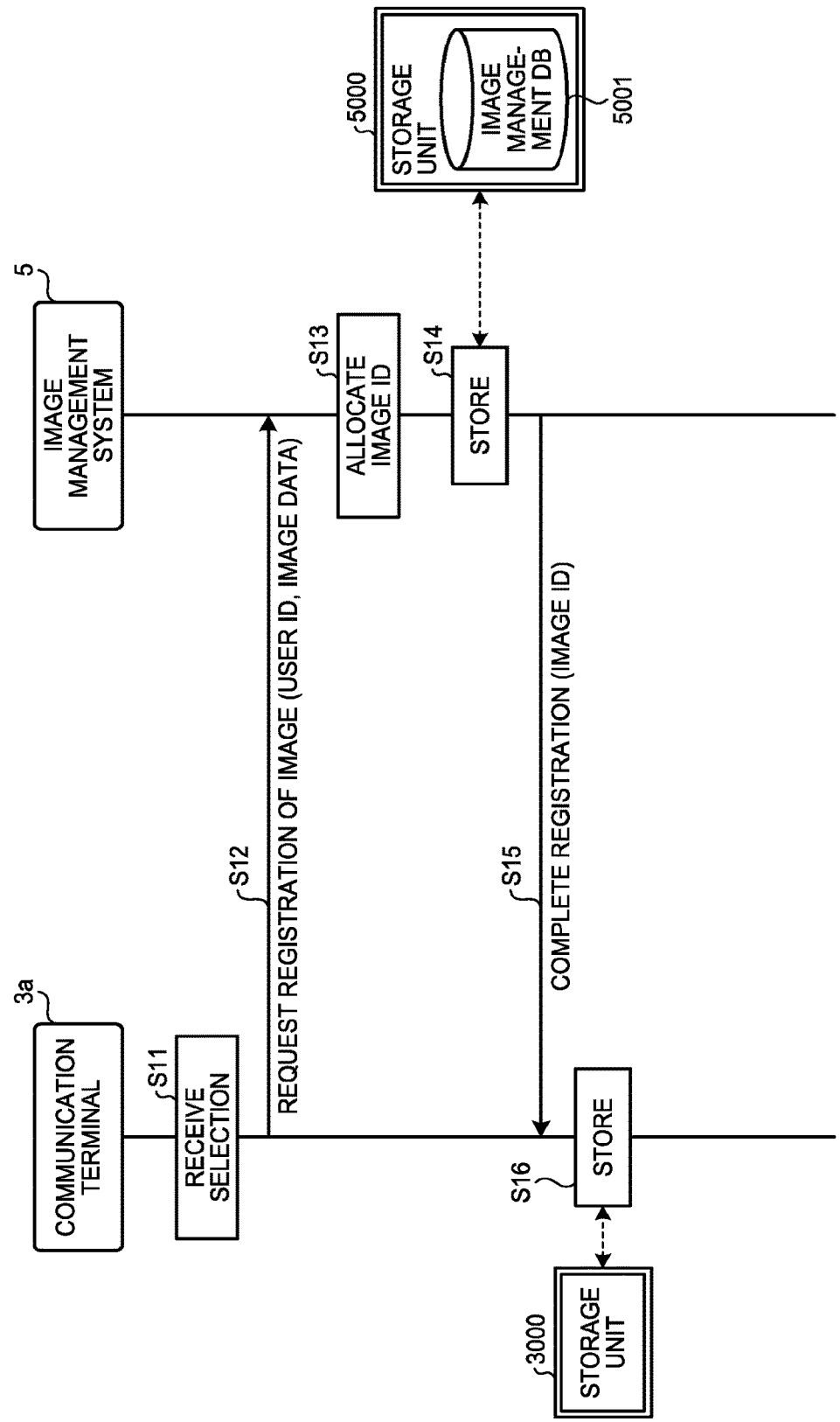
FIG. 24 is a sequence diagram illustrating a process of uploading image data.

Next, a description will be given regarding a process of uploading the image data of the captured image illustrated in FIG. 4-3 performed by the user A using the communication terminal 3a with reference to FIG. 24. FIG. 24 is a sequence diagram illustrating the process of uploading the image data.

Protocol of communication performed among the communication terminal 3, the image management system 5, and the link information management system 7 via the communication network 9 is HTTP communication based on hypertext communication protocol (HTTP). The communication terminal 3a corresponds to an HTTP client, and the image management system 5 and the link information management system 7 correspond to an HTTP server.

First, the user A takes, from the capturing device 1, the image data of the captured image illustrated in FIG. 4-3 in the storage unit 3000 of the communication terminal 3a. Further, when the user A selects image data to be uploaded, the operational input receiving unit 32 of the communication terminal 3a receives selection of the image data to be uploaded (Step S11).

Next, the transmitting and receiving unit 31 of the communication terminal 3a requests registration of the image by transmitting the user ID of the user A and the image data to be uploaded to the image management system 5 via the communication network 9 (Step S12). Accordingly, the transmitting and receiving unit 51 of the image management system 5 receives the user ID and the image data.

Next, the identification information allocating unit 52 of the image management system 5 allocates the image ID to the image data received in Step S12 and adds the image ID to the header section of the image data (Step S13).

Next, the storing and reading unit 59 stores and manages the user ID received in Step S12, the file name of the image data, and the image ID allocated in Step S13 in the image management table (see FIG. 20) in an associated manner, and stores and manages the image data in the storage unit 5000 (Step S14).

Next, the transmitting and receiving unit 51 performs notification of completion of registration by transmitting the image ID allocated in Step S13 to the communication terminal 3a via the communication network 9 (Step S15). Accordingly, the transmitting and receiving unit 31 of the communication terminal 3a receives the image ID. Further, the storing and reading unit 39 of the communication terminal 3a stores and manages the image ID (Step S16). When the user A or the user B downloads the image data in this state, the predetermined area image (the partial image Pd as illustrated in FIG. 10-2 is displayed on the display 315, and it is difficult for the user A or the user B to immediately recognize which image data has been downloaded. Thus, the user A makes the downloaded image data easily understandable through processing in Step S21 and its subsequent steps to be described later.

Figure 25:
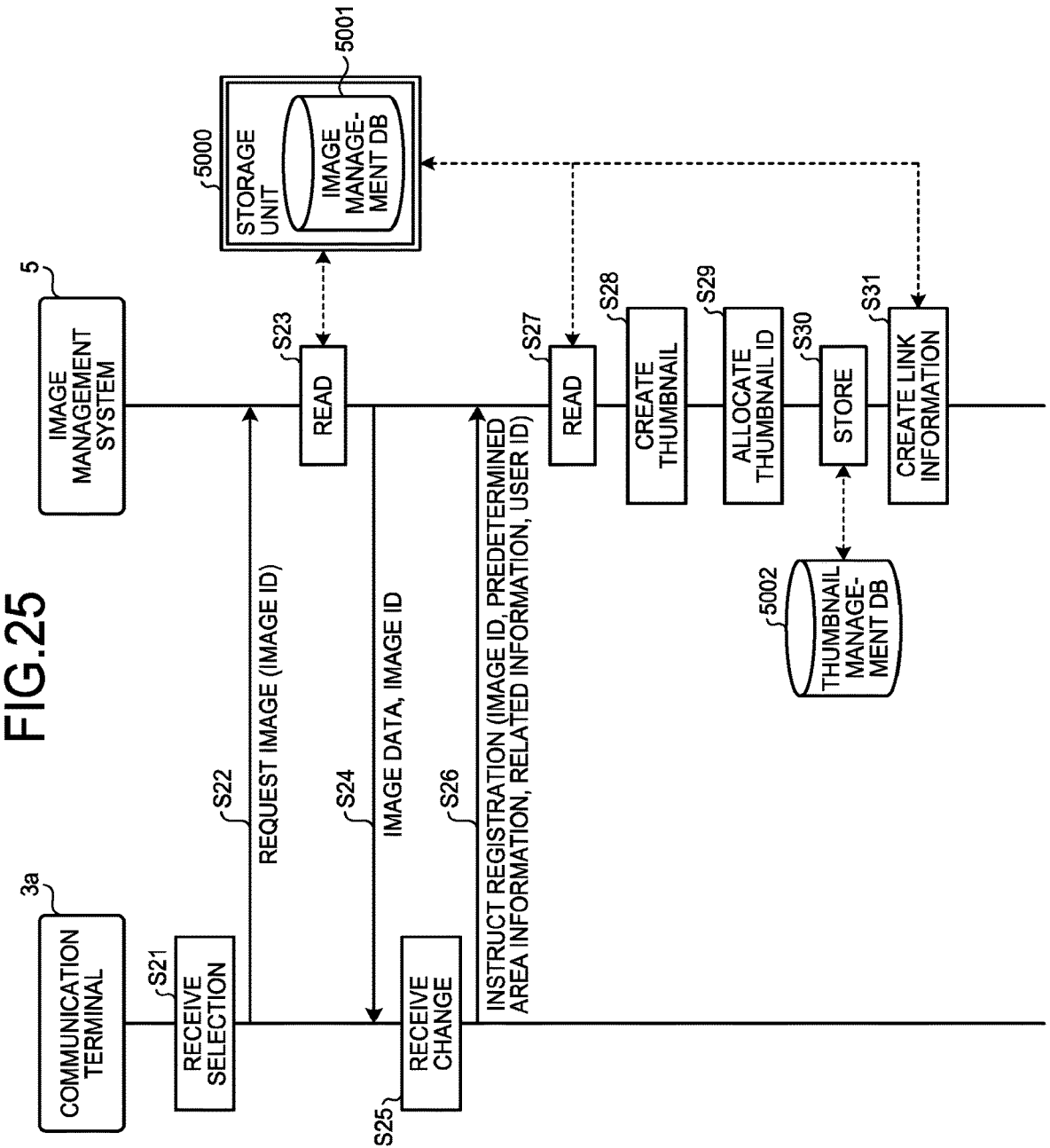
FIG. 25 is a sequence diagram illustrating a process of creating a thumbnail and link information.

Next, a process of creating and uploading the thumbnail will be described with reference to FIG. 25. FIG. 25 is a sequence diagram illustrating the process of creating and uploading the thumbnail.

As illustrated in FIG. 25, the user A selects the image data to be downloaded, whereby the operational input receiving unit 32 of the communication terminal 3a receives selection of the image data to be downloaded in the communication terminal 3a (Step S21). Accordingly, the storing and reading unit 39 reads the image ID of the selected image data from the storage unit 3000.

Next, the transmitting and receiving unit 31 of the communication terminal 3a requests the image by transmitting the image ID of the image data to be requested to the image management system 5 via the communication network 9 (Step S22). Accordingly, the transmitting and receiving unit 51 of the image management system 5 receives the image ID.

Next, the storing and reading unit 59 of the image management system 5 searches the image management table (see FIG. 20) using the image ID received in Step S22 as a search key to extract the file name of the corresponding image data, and reads the image data having the file name from the storage unit 5000 (Step S23).

Next, the transmitting and receiving unit 51 transmits the image data read in Step S23 described above and the image ID received in Step S22 described above to the communication terminal 3a via the communication network 9 (Step S24). Accordingly, when the transmitting and receiving unit 31 of the communication terminal 3a receives the image data and the image ID, the download of the image data is completed. In this state, the default predetermined area image (the partial image $P_0$) as illustrated in FIG. 10-2 is still displayed in the communication terminal 3a.

Further, when the operational input receiving unit 32 receives the operation of the user A, the display control unit 33 changes the predetermined area image from the predetermined area image (the partial image Pd as illustrated in FIG. 10-2 to the predetermined area image (the partial image $P_1$) as illustrated in FIG. 11 in the communication terminal 3a (Step S25). At this time, the operational input receiving unit 32 also receives not only input of the above-described related information from the user A but also a request for setting the predetermined area image illustrated in FIG. 11 to the default display (Step S25).

Next, the transmitting and receiving unit 31 instructs the image management system 5 to register the link information by transmitting the image ID, the predetermined area information representing the partial image $P_1$, the related information, and the user ID to the image management system 5 via the communication network 9 (Step S26). Accordingly, the transmitting and receiving unit 51 of the image management system 5 receives the image ID, the predetermined area information representing the partial image $P_1$, the related information, and the user ID.

Next, the storing and reading unit 59 searches the image management table (see FIG. 20) using the image ID received in Step S26 as a search key to extract the file name of the corresponding image data, and reads the image data having the file name from the storage unit 5000 based on this file name (Step S27). Further, the thumbnail creating unit 53 creates the thumbnail data using the predetermined area T in the image data as illustrated in FIGS. 9 to 12 based on the image data read in Step S27 and the predetermined area T represented by the predetermined area information received in Step S26 (Step S28).

Next, the identification information allocating unit 52 allocates the thumbnail ID to thumbnail data created in Step S28 and adds the thumbnail ID to the header section of this thumbnail data (Step S29). Further, the storing and reading unit 59 performs management by storing the thumbnail ID allocated in Step S29, the image ID received in Step S26 described above, and the thumbnail data created in Step S28 described above in the thumbnail management table (see FIG. 21) in an associated manner (Step S30).

Next, the link information creating unit 54 creates the link information illustrated in FIG. 13 by linking the URL of the image data represented by the image ID received in Step S26, the image ID received in Step S26, and the predetermined area information received in Step S26 (Step S31).

Figure 26:
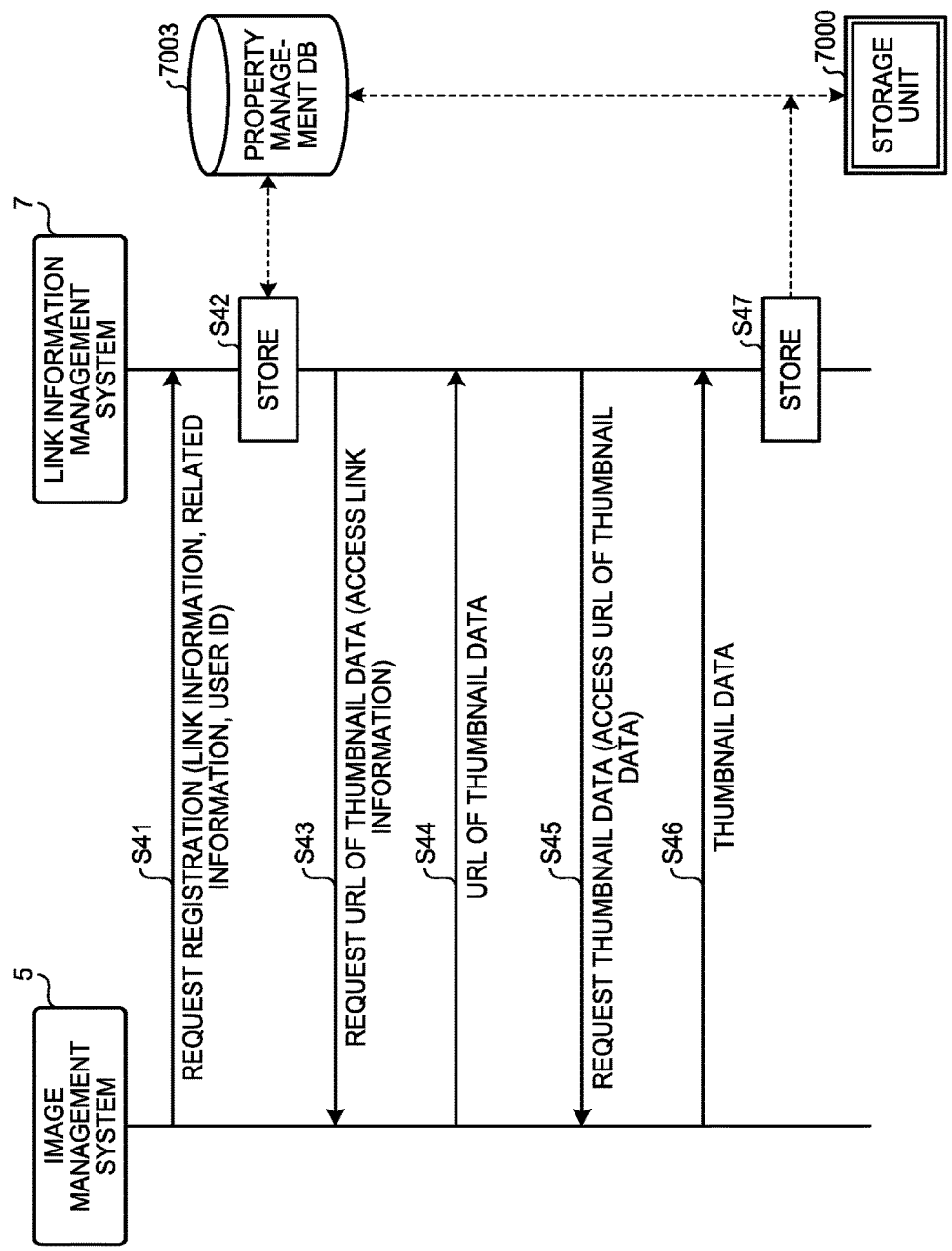
FIG. 26 is a sequence diagram illustrating a process of uploading the thumbnail and the link information.

Next, a process of uploading the thumbnail and the link information will be described with reference to FIG. 26. FIG. 26 is a sequence diagram illustrating the process of uploading the thumbnail and the link information.

First, the transmitting and receiving unit 51 of the image management system 5 requests registration of the link information in the link information management system 7 by transmitting the link information created in Step S31 described above, and the related information and the user ID received in Step S26 described above to the link information management system 7 via the communication network 9 (Step S41). Accordingly, the transmitting and receiving unit 71 of the link information management system 7 receives the link information, the related information, and the user ID.

Next, the storing and reading unit 79 of the link information management system 7 performs the registration (management) by storing the user ID, the link information, and the related information received in Step S41 described above for each of the property ID's in the property management table (see FIG. 23) in an associated manner (Step S42). The related image is created by the user A or the administrator Y, and is associated with the property ID by the storing and reading unit 79 as described above. In this state, however, the management of the thumbnail data is not performed in the link information management system 7. Thus, the transmitting and receiving unit 71 requests a URL of the thumbnail data by accessing the image management system 5 specified by the URL included in the link information (Step S43). Accordingly, the transmitting and receiving unit 51 of the image management system 5 receives the request of the URL of the thumbnail data.

Next, the transmitting and receiving unit 51 of the image management system 5 transmits the URL of the thumbnail data to the link information management system 7 via the communication network 9 (Step S44). Accordingly, the transmitting and receiving unit 71 of the link information management system 7 receives the URL of the thumbnail data.

Next, the transmitting and receiving unit 71 of the link information management system 7 requests the thumbnail data by accessing the image management system 5 specified by the URL of the thumbnail data (Step S45). Accordingly, the transmitting and receiving unit 51 of the image management system 5 receives the request of the thumbnail data.

Next, the transmitting and receiving unit 51 of the image management system 5 transmits the thumbnail data to the link information management system 7 via the communication network 9 (Step S46). Accordingly, the transmitting and receiving unit 71 of the link information management system 7 receives the thumbnail data. Further, the storing and reading unit 79 adds and stores the file name of the thumbnail data received in Step S46 described above in a field section of the file name of the thumbnail data in the property management table (see FIG. 23) and stores and manages the thumbnail data in the storage unit 7000 (Step S47).

Figure 27:
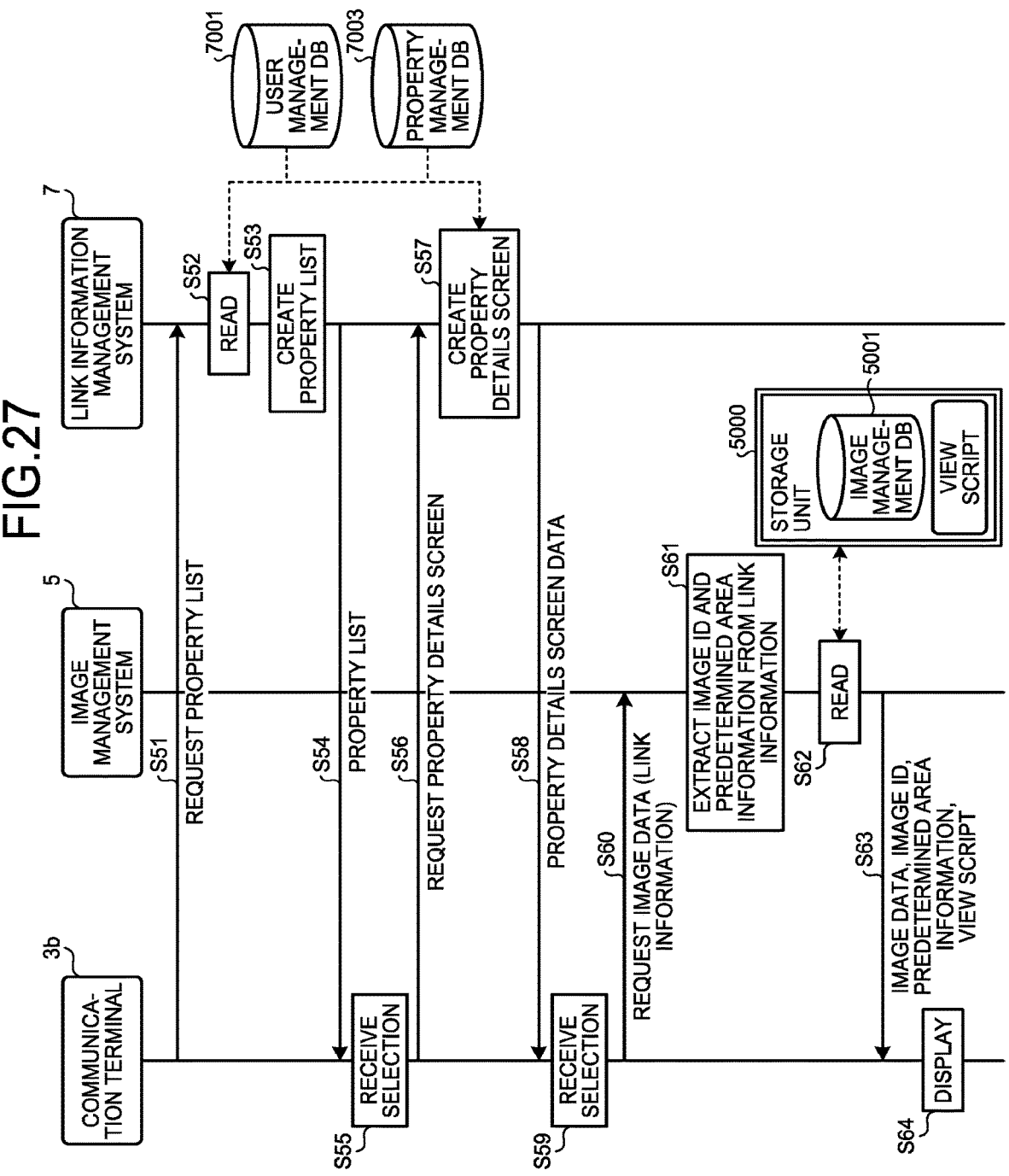
FIG. 27 is a sequence diagram illustrating a process of downloading image data.

Next, a process of downloading the image data will be described with reference to FIG. 27. FIG. 27 is a sequence diagram illustrating the process of downloading the image data.

First, the operational input receiving unit 32 of the communication terminal 3b receives a request of a property list from the user B, the transmitting and receiving unit 31 transmits the request of the property list to the link information management system 7 (Step S51). Accordingly, the transmitting and receiving unit 71 of the link information management system 7 receives the request of the property list.

Next, the storing and reading unit 79 of the link information management system 7 reads each piece of user personal information (real estate business operator name or the like) from the user management table see (FIG. 22), and reads each of the property ID's, each piece of the related information, and each of the related images from the property management table (see FIG. 23) (Step S52). Further, the screen creating unit 72 creates the property list based on the respective data read in Step S52 (Step S53). The property ID is embedded for each of the properties in the data of the property list. Thereafter, the transmitting and receiving unit 71 transmits the data of the property list created in Step S53 to the communication terminal 3b (Step S54). Accordingly, the transmitting and receiving unit 31 of the communication terminal 3b receives the data of the property list.

Next, the display control unit 33 displays the property list and receives selection of a desired property from the user B in the communication terminal 3b (Step S55). Further, the transmitting and receiving unit 31 of the communication terminal 3b transmits a request of the property details screen to the link information management system 7 (Step S56). At this time, the transmitting and receiving unit 31 of the communication terminal 3b transmits the property ID of the property for which selection has been received in Step S55. Accordingly, the transmitting and receiving unit 71 of the link information management system 7 receives the request of the property details screen together with the property ID.

Next, the screen creating unit 72 creates the property details screen as illustrated in FIG. 14 (Step S57). Herein, a method of creating the property details screen will be described. First, the storing and reading unit 79 searches the property management table (see FIG. 23) using the property ID transmitted in Step S56 described above as a search key to read the user ID, the link information, the file name of the thumbnail data, the related information, and the related image which correspond to the property ID. In addition, the storing and reading unit 79 searches the user management table (see FIG. 22) using the above-described user ID as a search key to read the corresponding user personal information. Further, the screen creating unit 72 creates the above-described property details screen 3200 as illustrated in FIG. 14 using the link information, the file name of the thumbnail data, the related information and the related image, and the user personal information. The above-described link information is embedded in the thumbnails (3240a, 3240b, 3240c), and a hyperlink is established.

Next, the transmitting and receiving unit 71 of the link information management system 7 transmits data of the property details screen created in Step S57 to the communication terminal 3b via the communication network 9 (Step S58). Accordingly, the transmitting and receiving unit 31 of the communication terminal 3b receives the data of the property details screen. Further, the property details screen as illustrated in FIG. 14 is displayed on the display 508 of the communication terminal 3b.

Next, the operational input receiving unit 32 of the communication terminal 3b eventually receives selection of the link information by receiving selection of a desired thumbnail from the user B (Step S59).

Next, the transmitting and receiving unit 31 of the communication terminal 3b requests the image data by transmitting the link information selected in Step S59 described above to the image management system 5 (Step S60). Accordingly, the transmitting and receiving unit 51 of the image management system 5 receives the link information.

Next, the extracting unit 55 of the image management system 5 extracts the image ID and the predetermined area information from the link information received in Step S60 described above (Step S61). Further, the storing and reading unit 59 searches the image management table (see FIG. 20) using the image ID extracted in Step S61 as a search key to extract the corresponding file name of the image data, and reads the image data of the file name from the storage unit 5000 (Step S62). Further, the storing and reading unit 59 also reads the view script from the storage unit 5000 (Step S62).

Next, the transmitting and receiving unit 51 transmits the image data and the view script read in Step S62 and the image ID and the predetermined area information extracted from the link information in Step S61 to the communication terminal 3b via the communication network 9 (Step S63). Accordingly, the transmitting and receiving unit 31 of the communication terminal 3b receives the image data, the view script, the image ID, and the predetermined area information.

Next, the display control unit 33 of the communication terminal 3b activates the view script received in Step S63, and creates and displays the predetermined area image (the partial image $P_1$) using the predetermined area T in the image data as illustrated in FIG. 15 based on the image data and the predetermined area information (Step S64).

Main Effect of Present Embodiment

As described above, the image management system 5 transmits the view script, configured to view the full-spherical panoramic image, as well as transmits the image data to the communication terminal 3b according to the present embodiment. Accordingly, the user B of the communication terminal 3b can view the full-spherical panoramic image of the property even if an application for viewing of the full-spherical panoramic image is not installed in the communication terminal 3b. Accordingly, the administrator Y (service provider) can improve the service with respect to the user, and thus, the effect of enabling achievement of differentiation from other service providers is obtained.

Supplement of Embodiment

Although the URL representing a location of the image management system 5 on the communication network 9 is included in the link information as illustrated in FIG. 13 in the above-described embodiment, the invention is not limited thereto. For example, the link information may be expressed only using the image ID and the predetermined area information without including the URL. In this case, the user operates the communication terminal 3 and inputs the URL.

Further, the image management system 5 and the link information management system 7 according to the above-described embodiment may be implemented in a single computer or may be implemented in a plurality of computers by dividing the units (the functions, means, or the storage units) and allocating the units as desired to the computers.

In addition, both the recording media, such as CD-ROM, in which each program of the above-described embodiment is stored and the HD 504 in which the programs are stored can be provided domestically or abroad as program products.

REFERENCE SIGNS LIST

1 CAPTURING DEVICE
3a COMMUNICATION TERMINAL
3b COMMUNICATION TERMINAL
5 IMAGE MANAGEMENT SYSTEM
7 LINK INFORMATION MANAGEMENT SYSTEM
9 COMMUNICATION NETWORK
9a BASE STATION
9b BASE STATION
31 TRANSMITTING AND RECEIVING UNIT
32 OPERATIONAL INPUT RECEIVING UNIT
33 DISPLAY CONTROL UNIT
39 STORING AND READING UNIT
51 TRANSMITTING AND RECEIVING UNIT (EXAMPLE OF TRANSMISSION UNIT, EXAMPLE OF RECEPTION UNIT)

52 IDENTIFICATION INFORMATION ALLOCATING UNIT
53 THUMBNAIL CREATING UNIT (EXAMPLE OF THUMBNAIL CREATING UNIT)
54 LINK INFORMATION CREATING UNIT (EXAMPLE OF LINK INFORMATION CREATING UNIT)
55 EXTRACTING UNIT (EXAMPLE OF EXTRACTING UNIT)
59 STORING AND READING UNIT
71 TRANSMITTING AND RECEIVING UNIT
72 SCREEN CREATING UNIT
79 STORING AND READING UNIT
315 DISPLAY
3000 STORAGE UNIT
5000 STORAGE UNIT
5001 IMAGE MANAGEMENT DB (EXAMPLE OF IMAGE MANAGEMENT UNIT)
5002 THUMBNAIL MANAGEMENT DB (EXAMPLE OF THUMBNAIL MANAGEMENT UNIT)
7000 STORAGE UNIT
7001 USER MANAGEMENT DB (EXAMPLE OF USER MANAGEMENT UNIT)
7003 PROPERTY MANAGEMENT DB (EXAMPLE OF PROPERTY MANAGEMENT UNIT)

CITATION LIST

Patent Literature

Patent Literature 1: JP 2014-131215 A

The invention claimed is:

1. An image management system comprising:
a receiver that receives, from a first communication terminal, link information of full-spherical panoramic image data in response to the full-spherical panoramic image data received by the image management system from a second communication terminal being viewed from the first communication terminal, the link information data including information identifying a predetermined area of the full-spherical panoramic image data by x-axis, y-axis and angle of view coordinates, being transmitted from the image management system, and being managed in a link information management system together with a related image information different from the full-spherical panoramic image data; and
a transmitter that transmits, to the first communication terminal, a view script and the full-spherical panoramic image data corresponding to the link information, the view script determining how a full-spherical panoramic image is displayed, on the first communication terminal, together with the related image data,
wherein zooming of the predetermined area is expressed by widening or narrowing a range of the angle of view.

2. The image management system according to claim 1, wherein
the link information includes at least identification information associated with the full-spherical panoramic image data received from the second communication terminal, and
the image management system transmits the link information to the link information management system.

3. The image management system according to claim 1, further comprising an electronic memory to store therein the information identifying the predetermined area of the full-spherical panoramic image data.

4. The image management system according to claim 3, further comprising a processor that creates thumbnail data using the predetermined area of the full-spherical panoramic image data based on the image data received from the second communication terminal and based on the information identifying the predetermined area.

5. The image management system according to claim 1, wherein the link information includes specific information to specify a location of the image management system.

6. The image management system according to claim 5, wherein the specific information includes a URL of the image management system.

7. The image management system according to claim 1, wherein
the receiver receives, from the second communication terminal, data of related information relating to the full-spherical panoramic image data, and
the transmitter transmits, to the link information management system, the data of the related information.

8. The image management system according to claim 1, wherein
the receiver receives, from the second communication terminal, user identification information for identifying a user who uses the second communication terminal, and
the transmitter transmits, to the link information management system, the user identification information.

9. The image management system according to claim 1, wherein the full-spherical panoramic image data is Mercator image data that is capable of being displayed as a full-spherical panoramic image.

10. The image management system according to claim 1, wherein the view script is configured to allow viewing and manipulation of the full-spherical panoramic image data on a browser that is not compatible with JavaScript.

11. The image management system according to claim 1, wherein a subject of the full-spherical panoramic image data is a real estate property, and the related image information includes a location of the real estate property and contact information for a corresponding realtor.

12. An image management method that is executed by an image management system, the method comprising:
receiving, from a first communication terminal, link information of full-spherical panoramic image data in response to the full-spherical panoramic image data received by the image management system from a second communication terminal being viewed from the first communication terminal, the link information data including information identifying a predetermined area of the full-spherical panoramic image data by x-axis, y-axis, and view angle coordinates, being transmitted from the image management system, and being managed in a link information management system together with a related image different from the full-spherical panoramic image data; and
transmitting, to the first communication terminal, a view script and the full-spherical panoramic image data corresponding to the link information, the view script determining how a full-spherical panoramic image is displayed, on the first communication terminal, together with the related image data,
wherein zooming of the predetermined area is expressed by widening or narrowing a range of the angle of view.

* * * * *